United States Patent
Berol

(10) Patent No.: US 11,869,531 B1
(45) Date of Patent: Jan. 9, 2024

(54) ACOUSTIC EVENT DETECTION MODEL SELECTION

(71) Applicant: Amazon Technologies, Inc., Seattle, WA (US)

(72) Inventor: David Berol, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 778 days.

(21) Appl. No.: 16/709,617

(22) Filed: Dec. 10, 2019

(51) Int. Cl.
*G10L 25/51* (2013.01)
*G06N 5/04* (2023.01)
*G06F 3/16* (2006.01)
*G06N 20/00* (2019.01)
*G06F 16/2455* (2019.01)

(52) U.S. Cl.
CPC ............. *G10L 25/51* (2013.01); *G06F 3/165* (2013.01); *G06F 16/2455* (2019.01); *G06N 5/04* (2013.01); *G06N 20/00* (2019.01)

(58) Field of Classification Search
CPC .......... G10L 25/51; G06N 20/00; G06N 5/04; G06F 16/2455; G06F 3/165
See application file for complete search history.

(56) References Cited

U.S. PATENT DOCUMENTS

| 11,276,395 B1 * | 3/2022 | Jones .................. G10L 15/30 |
| 2016/0088403 A1 * | 3/2016 | Lambe ................ H04R 25/554 |
| | | 381/328 |
| 2016/0373876 A1 * | 12/2016 | Maher ................... H04S 7/307 |

* cited by examiner

*Primary Examiner* — Rasha S Al Aubaidi
(74) *Attorney, Agent, or Firm* — Lee & Hayes, P.C.

(57) ABSTRACT

Systems and methods for acoustic event detection model selection are disclosed. For example, models may be calibrated utilizing audio samples from sound output by specific audio-output devices. Thereafter, a determination may be made as to which audio-input devices are near a give audio-output device and a model selector may select a model trained to detect an acoustic event produced by the audio-output device. The proximate audio-input device(s) may be configured with the selected model to detect the acoustic event.

20 Claims, 11 Drawing Sheets

ACOUSTIC EVENT DETECTION MODEL SELECTION

BACKGROUND

Some electronic devices are configured to make noise, such as to indicate that one or more events have occurred. The same or other devices may be configured to capture sound corresponding to noises and to generate audio data corresponding to the captured sound. The audio data may be utilized for one or more purposes. Described herein are improvements in technology and solutions to technical problems that can be used to, among other things, assist in the use of audio data for one or more purposes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
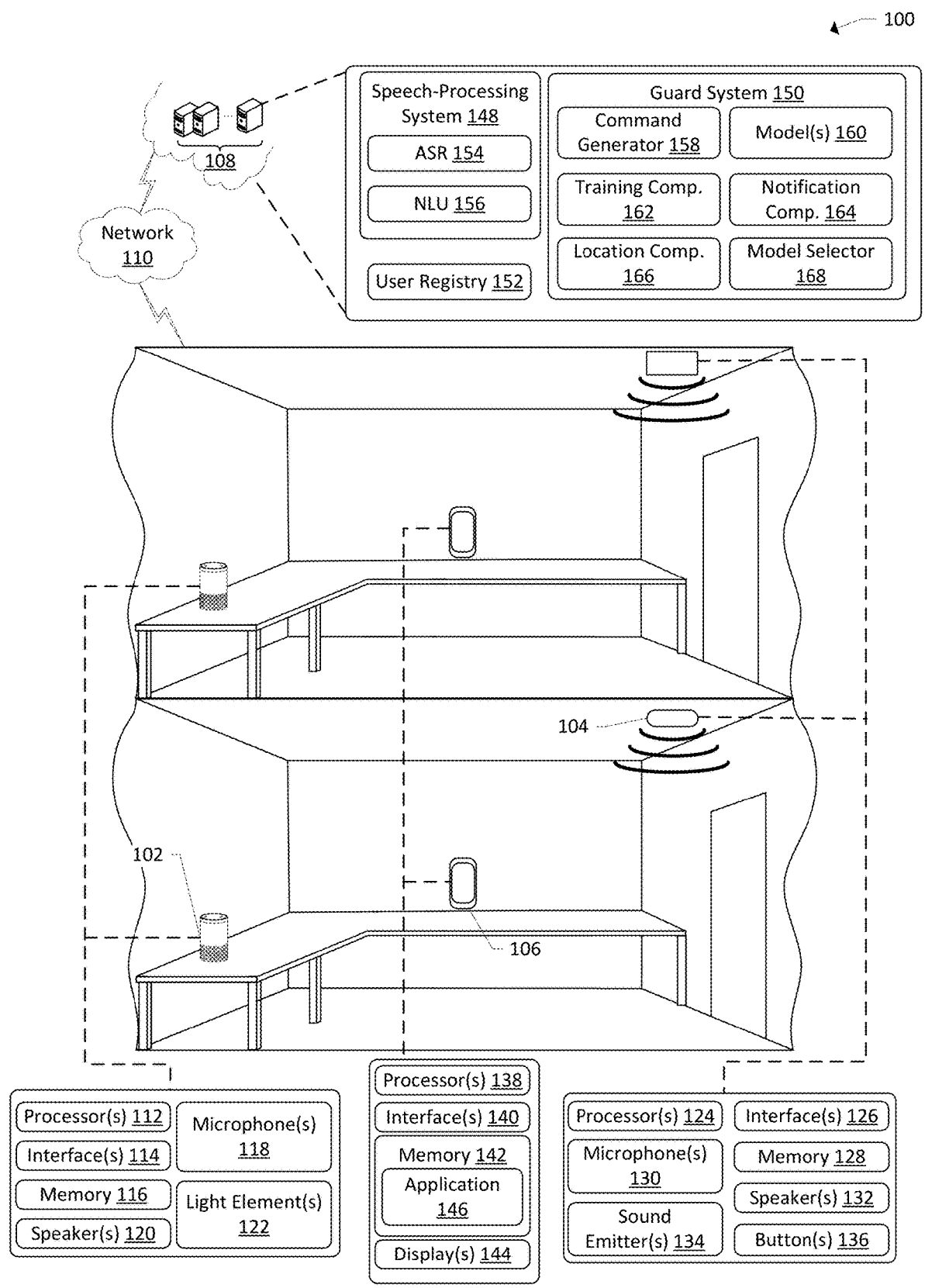
FIG. 1 illustrates a schematic diagram of an example environment for acoustic event detection model selection.

Systems and methods for acoustic event detection model selection are disclosed. Take, for example, an environment, such as a home, where multiple electronic devices may be disposed. Some of those electronic devices may be audio-input devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These audio-input devices may have a number of components and features, but specifically may have a microphone configured to capture audio and to generate corresponding audio data. These electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The environment may also include electronic devices such as audio-output devices. The audio-output devices may be the same as or similar to the audio-input devices, but may specifically include a speaker and/or other sound emitter configured to emit sound. It should be understood that the electronic devices described herein may be audio-input devices, audio-output device, or both.

In examples, at least one of the audio-output devices may be configured to emit a particular sound, such as audio corresponding to a smoke alarm, a carbon dioxide alarm, a timer, a notification, a security system alarm, etc. While these devices output sound to, in examples, provide an indication that an event has occurred, such as the detection of smoke, the detection of carbon dioxide, the expiration of a timer, etc., such sound output may be helpful only in situations where a user is positioned close enough to the audio-output device to hear the sound, for example. The audio-input devices may be utilized to "listen" for such sounds and when an acoustic event corresponding to the sound is detected, an associated system may perform one or more actions, such as generating and sending a notification to a user device, for example. However, audio-output devices may vary widely in the types of sounds emitted, the intensity of such sounds, the frequency of such sounds, the duration of such sounds, and/or other attributes of how such sounds are output. Additionally, the types of audio-input devices may vary widely, including the microphone types and configurations of such audio-input devices as well as filtering and/or processing techniques utilized in association with audio data generated by the audio-input devices. Furthermore, the positioning of audio-input devices and audio-output devices with respect to each other, as well as variables in the environment in which such devices are disposed, such as room size, types and number of objects in the room, etc. may impact the way the audio-input devices capture audio and generate the resulting audio data.

While one or more acoustic-event-detection models may be generated and utilized to detect acoustic events from audio data, those models may be trained based on a limited amount of sample audio data. Increasing the audio data sampling in in situ event situations may be useful to train the acoustic-event-detection models to better detect the occurrence of given acoustic events and/or to increase the confidence that an event has been detected. To do so, in examples, audio-input devices associated with a given user account may be transitioned to a calibration mode. For example, account data may indicate one or more audio-input devices associated with the user account. Those audio-input devices may be configured to communicate with a remote system, and the remote system may generate and send a command to some or all of the audio-input devices instructing the audio-input devices to transition to the calibration mode. The calibration mode may include causing the microphones to be enabled for capturing audio from the environment. The calibration mode may alternatively include causing the audio-input devices to generate and/or send audio data corresponding to captured audio to the remote system. For example, certain audio-input devices may be "always on," such that a microphone of a given audio-input device continuously captures audio and generates audio data, but that audio data is not utilized until, for example, a wake word is detected. In these examples, the command may cause the audio-input devices to send the audio data to the remote system and/or to analyze the audio data for acoustic events without detecting the wake word.

Determining when to cause the audio-input devices to transition to a calibration mode may be based at least in part on one or more indications. For example, request data may be received from a given audio-input device, a user device, and/or a given audio-output device for calibration of acoustic event detection to initiate. Such request data may include input data from a user utilizing a user device, input data from a user selecting a button on the audio-output device, audio data representing a user utterance from a user of the audio-input device, etc. In other examples, initiation of acoustic event calibration may be based at least in part on the remote system determining that the environment is in a condition for calibration to be initiated. For example, the remote system may determine that the environment is unoccupied and/or that no sound and/or only ambient sound is present in the environment, such as for a given period of time. In these and other instances, the remote system may determine that calibration of acoustic event detection may be initiated. It should be understood that calibration of acoustic event detection, including automatic initiation of such calibration, may be performed only in examples where user permission to do so has been provided.

In certain examples, the audio-output device may be acquired in association with account data. For example, an online marketplace may be utilized to acquire the audio-output device, and a user account may be utilized during the acquisition. That account data may indicate one or more audio-input devices associated with the user account and/or one or more settings associated with the audio-input devices, such as settings indicating that the audio-input devices have been configured to detect acoustic events and/or otherwise have been configured to "guard" an environment associated with the audio-input devices. In these examples, the remote system may generate one or more notifications informing a user that calibration may be performed. User input may be provided indicating a desire to perform the calibration, and calibration may be initiated based at least in part on that input data.

Once the audio-input devices have transitioned to a calibration mode, a given audio-output device may be caused to emit sound corresponding to the acoustic event. In examples, the audio-output device is a "smart" device configured to send and receive information, such as over a wireless network. In these examples, the remote system may send another command to the audio-output device to cause the audio-output device to emit the sound. In other examples, the audio-output device may not include communication means, and in these examples, a notification may be sent to the audio-output device, the audio-input device, and/or a user device requesting that a user manually cause the audio-output device to emit the sound. This may include, for example, the user pressing a button designated as a "test" button or otherwise providing input to the audio-output device in a way that causes the audio-output device to emit sound.

Some or all of the audio-input devices may capture the sound produced by the audio-output device and may generate corresponding audio data. In examples where the audio-input devices are configured with acoustic-event-detection models residing in memory of the audio-input devices, the audio-input devices may input audio data generated by their respective microphones into the model(s). The model(s) may be utilized to detect the acoustic event and to generate a confidence value or other metric associated with detection of the acoustic event. Based at least in part on the audio-input device being in the calibration mode, a weighted confidence value may be generated indicating more confidence that the audio data corresponds at least in part to the acoustic event. Additionally, in examples, an audio signature of the audio data may be stored in association with the audio-input device. The audio signature may be utilized as a reference audio signature for detecting subsequent acoustic events from sound captured by microphones of the audio-input device. In this way, the audio-input device may be calibrated to detect the sound as produced by the particular audio-output device in the environment at issue. The same or a similar process may be perform for some or each of the audio-input devices in the environment such that each device may be calibrated to detect the acoustic event associated with the audio-output device.

Additionally, the remote system may be configured with acoustic-event-detection models. In examples, the models residing at the remote system may be more robust and/or may utilize more computing resources to determine if a given sample of audio data includes an acoustic event. These models at the remote system may be utilized to confirm the detection of acoustic events at the audio-input devices and/or to determine that detection of an acoustic event at an audio-input device is a false positive. A training component of the remote system may utilize the audio data and/or confidence values determined during calibration of acoustic event detection to train the acoustic-event-detection models, which may be utilized for a given user account and/or across multiple user accounts. For example, the audio signature of the audio data may be added to a repository of reference audio signatures associated with detection of an given event. Additionally, metadata associated with the devices at issue may be utilized to train one or more models to more accurately detect the occurrence of an event. For example, the metadata may include location data, device-type data, spatial data, etc. In these examples, calibration of acoustic event detection from audio-output devices associated with the same or similar metadata may be performed. For example, if calibration of acoustic event detection is performed on a given audio-output device having a given device type, being associated with a given location, and/or being associated with spatial data indicating a given distance from an audio-input device, calibration of acoustic event detection from other audio-output devices associated with similar metadata may be performed utilizing the calibration audio data.

Additionally, or alternatively, the processes described herein may be utilized to determine that one or more audio-input devices are silenced such that a microphone of a given audio-input device is not capturing audio and/or generating audio data. For example, the remote system may send a command to a given audio-input device to send audio data corresponding to the sound emitted by the audio-output device. However, the audio-input device may not send such audio data because the device is silenced. Based at least in part on not receiving audio data from the audio-output device, one or more notifications may be generated and sent to a user device. The notifications may indicate that the audio-input device is silenced and may request that the user transaction the audio-input device so that it may be utilized for calibration and/or other purposes, such as detection of acoustic events when desired by the user. In other examples, during calibration for example, request data for a microphone state of a given audio-input device may be sent to the audio-input device. The audio-input device may respond to the request data by indicating whether the microphone is silenced or operational. In examples where the response indicates the microphone is silenced, the one or more notifications may be generated.

Additionally, a location component may be configured to determine a location of the various devices described herein and/or to determine a relative location of devices with respect to each other, including whether a given device is closer to a particular device or another device. For example, the user registry may store, in association with account data: first data indicating a first device identifier of a first audio-output device; and second data indicating a second device identifier of a second audio-output device. For example, account data for a given user account may be stored in a user registry and may include data associated with devices associated with that account data. For example, the account data may indicate device identifiers of the various audio-input and audio-output devices associated with the user account. Details associated with the devices may also be stored in association with the account, such as characteristics of sounds produced by the audio-output devices and/or the acoustic-event-detection models associated with given audio-output devices.

The location component may determine that a first location of the first audio-output device is closer to a second location of a first audio-input device than to a third location of a second audio-input device. For example, the locations of devices may be based at least in part on whether audio is received by the audio-input devices, the signal strength and/or other audio characteristics of the audio received at the audio-input devices, contextual information such as naming indicators associated with the devices, device affinities, image data, device beaconing, etc. In examples, determining the locations may include causing the first audio-output device to produce sound and receiving, from the first audio-input device, audio data representing the sound. A determination may be made that the second audio-input device failed to send the audio data representing the sound. In these examples, determining that the first location is closer to the second location than to the third location may be based at least in part on receiving the audio data from the first audio-input device and determining that the second audio-input device failed to send the audio data.

Additionally, or alternatively, determining the location may include causing the first audio-output device to produce sound and receiving, from the first audio-input device, first audio data representing the sound. Second audio data representing the sound may also be received from the second audio-input device. In these examples, determining that the first location is closer to the second location than to the third location may be in response to a first signal strength of the first audio data being stronger than a second signal strength of the second audio data.

Additionally, or alternatively, determining the location may include determining, from the account data, a first naming indicator associated with the first audio-output device, the first naming indicator including a first location reference. Determining the location may also include determining, from the account data, a second naming indicator associated with the first audio-input device, the second naming indicator including a second location reference. The location component may determine that the first location reference corresponds to the second location reference. In these examples, determining that the first location is closer to the second location than to the third location may be in response to the first location reference corresponding to the second location reference.

In examples where there are multiple audio-output devices, the location component 166 may determine that a fourth location of the second audio-output device is closer to the third location than to the second location. Determining the device locations may be performed in the same or a similar manner as described above.

The model selector may be configured to identify a first acoustic-event-detection model associated with the first device identifier of the first audio-output device. For example, the account data may indicate one or more acoustic-event-detection models associated with the first device identifier. In other examples, a database of models may be queried utilizing the device identifier and/or other information associated with the audio-output device. In examples where multiple audio-output devices are associated with an environment, a model may be selected for each audio-output device and may be sent to the one or more audio-input devices.

The model selector may also be configured to, in response to determining that the first location is closer to the second location than to the third location, configuring the first audio-input device to detect first acoustic events utilizing the first acoustic-event-detection model. For example, the audio-input device may be configured to store one or more acoustic-event-detection models, which may be utilized by a digital signal processor of the device to detect acoustic events. The selected acoustic-event-detection model may be sent to the audio-input device for storage and use by the device. The other audio-input devices may also be configured in a similar manner.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for acoustic event detection model selection. The system 100 may include, for example, an audio-input device 102. The audio-input device 102 may be configured to receive audio associated with an environment, generate corresponding audio data, perform operations associated with the audio data such as detection of acoustic events, and/or output audio to the environment, for example. In other examples, the device 102 may not include a voice interface and/or may include an interface other than a voice interface, which may include devices such as televisions, settop boxes, tablets, and/or other devices where given media is made available based on identifying the user after associating the guest account as described herein. For example, the audio-input device 102 may be one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These audio-input devices may have a number of components and features, but specifically may have a microphone 118 configured to capture audio and to generate corresponding audio data. These electronic devices may be situated in a home, a place a business, healthcare facility (e.g., hospital, doctor's office, pharmacy, etc.), in vehicle (e.g., airplane, truck, car, bus, etc.) in a public forum (e.g., shopping center, store, etc.), for example. The environment may also include electronic devices such as audio-output devices 104. The audio-output devices 104 may be the same as or similar to the audio-input devices 102, and may also include a speaker 132 and/or other sound emitter 134 configured to emit sound. It should be understood that the electronic devices described herein may be audio-input devices 102, audio-output devices 104, or both.

The system 100 may also include one or more user devices 106, which may be associated with the audio-input devices 102, audio-output devices 104, and/or given account data. The system 100 may also include a remote system 108 configured to communicate with the audio-input device 102, the audio-output device 104, and/or the user device 106, such as via a network 110.

The audio-input device 102 may include one or more components, such as, for example, one or more processors 112, one or more network interfaces 114, memory 116, one or more microphones 118, one or more speakers 120, and/or one or more light elements 122. The microphones 118 may be configured to capture audio, such as audio corresponding to sounds from the audio-output devices 104, and generate corresponding audio data. The speakers 120 may be configured to output audio, such as audio corresponding to audio data received from another device and/or the system 108. It should be understood that while several examples used herein include an audio-input device 102 that allows users to interact therewith via user utterances, one or more other devices, which may not include a voice interface, may be utilized instead of or in addition to voice interface devices. In these examples, the device may be configured to send and receive data over the network 108 and to communicate with other devices in the system 100. As such, in each instance where a voice interface device is utilized, a computing device that does not include a voice interface may also or alternatively be used.

The audio-output devices 104 may include one or more components, such as, for example, one or more processors 124, one or more network interfaces 126, memory 128, one or more microphones 130, one or more speakers 132, one or more sound emitters 134, and/or one or more buttons 136. The microphones 130 and speakers 132 may be the same or similar and may perform the same or similar functions as the microphones 118 and speakers 120 of the audio-input device 102. The sound emitters 134 may be the same as the speakers 120 in some examples. In other examples, the sound emitters 134 may include separate components from the speakers 120, such as piezo-electric components that are configured to emit sound. The buttons 136 may be configured to be actuated to cause the audio-output device 104 to perform certain actions. The actions performed upon actuation of the buttons 136 may include causing sound to be emitted and/or causing the audio-output device 104 to transition between operating modes. It should be understood that the audio-input devices 102 may be the audio-output devices 104 and vice versa.

The user device 106 may include one or more components, such as, for example, one or more processors 138, one or more network interfaces 140, memory 142, and/or one or more displays 1144. The displays 144 may be configured to present information and user interfaces to a user of the user device 106. The displays 144 may also include input functionality, such as a touchscreen, that may allow for user input to be received. The memory 142 may include one or more components such as, for example, an application 146, which may reside on the memory 142 and/or be accessible to the user device 106. The application 146 may be configured to cause the processor(s) 138 to receive information associated with interactions with the audio-input device 102 and/or the audio-output device 104 and cause display of representations, such as text and/or images, associated with the interactions. The application 146 may also be utilized, in examples, to receive input data, such as from a user of the user device 106, and send the input data and/or instructions associated with the input data to the remote system 108. The application 146 may also be utilized to display notifications and/or alerts received, for example, from the remote system 108.

The remote system 108 may include components such as, for example, a speech-processing system 148, a guard system 150, and/or a user registry 152. It should be understood that while the speech-processing system 148, the guard system 150, and the user registry 152 are depicted as separate from each other in FIG. 1, some or all of the components may be a part of the same system. The speech-processing system 148 may include an automatic speech recognition component (ASR) 154 and/or a natural language understanding component (NLU) 156. The guard system 150 may include one or more components such as, for example, a command generator 158, one or more models 160, a training component 162, a notification component 164, a location component 166, and/or a model selector 168. Each of the components described herein with respect to the remote system 108 may be associated with their own systems, which collectively may be referred to herein as the remote system 108, and/or some or all of the components may be associated with a single system. Additionally, the remote system 108 may include one or more applications, which may be described as skills, actions, and/or capsules. For example, a skill may receive data representing an intent. For example, an intent may be determined by the NLU component 156 and/or as determined from user input via a computing device. Skills may be configured to utilize the intent to output data for input to a TTS component, a link or other resource locator for audio data, and/or a command to a device, such as the audio-input device 102.

In instances where an audio-input device 102 is utilized, skills may extend the functionality of smart devices that can be controlled by users utilizing a voice-user interface. In some examples, skills may be a type of application that may be useable in association with smart devices and may have been developed specifically to work in connection with given smart devices. Additionally, skills may be a type of application that may be useable in association with an electronic device and may have been developed specifically to provide given functionality to the electronic device. In examples, a non-skill application may be an application that does not include the functionality of a skill. Speechlets, as described herein, may be a type of application that may be usable in association with electronic devices and may have been developed specifically to work in connection voice interfaces of with electronic devices. The application(s) may be configured to cause processor(s) to receive information associated with interactions with the audio-input device 102. The application(s) may also be utilized, in examples, to receive input, such as from a user of the user device 104, and send data and/or instructions associated with the input to one or more other devices.

The components of the remote system 108 are described in detail below. In examples, some or each of the components of the remote system 108 may include their own processor(s), network interface(s), and/or memory. As such, by way of example, the speech-processing system 148 may include and/or be associated with processor(s), network interface(s), and/or memory. The guard system 150 may include and/or be associated with different processor(s), network interface(s), and/or memory, or one or more of these components may utilize some or all of the same processor(s), network interface(s), and/or memory utilized by the speech-processing system 148. These components are described in detail below. Additionally, the operations and/or functionalities associated with and/or described with respect to the components of the remote system 108 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The components of the remote system 108 as outlined above will now be described with reference to several examples. It should be understood that the examples provided herein are for illustration and should not be construed as a limitation of this disclosure.

The user registry component 152 may be configured to identify, determine, and/or generate associations between users, user accounts, and/or devices. For example, one or more associations between user accounts may be identified, determined, and/or generated by the user registry 152. The user registry 152 may additionally store information indicating one or more applications and/or resources accessible to and/or enabled for a given user account. Additionally, the user registry 152 may include information indicating device identifiers, such as naming identifiers, associated with a given user account, as well as device types associated with the device identifiers. The user registry 152 may also include information indicating user account identifiers, naming indicators of devices associated with user accounts, and/or associations between devices, such as the audio-input device 102. The user registry 152 may also include information associated with usage of the smart devices and/or the voice interface devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

To perform the acoustic event calibration described herein, the audio-input devices 102 associated with a given user account may be transitioned to a calibration mode. For example, account data may indicate one or more audio-input devices 102 associated with the user account. Those audio-input devices 102 may be configured to communicate with the remote system 108, and the command generator 158 may generate and send a command to some or all of the audio-input devices 102 instructing the audio-input devices 102 to transition to the calibration mode. The calibration mode may include causing the microphones 118 to be enabled for capturing audio from the environment. The calibration mode may alternatively include causing the audio-input devices 102 to generate and/or send audio data corresponding to captured audio to the remote system 108. For example, certain audio-input devices 102 may be "always on," such that a microphone 118 of a given audio-input device 102 continuously captures audio and generates audio data, but that audio data is not utilized until, for example, a wake word is detected. In these examples, the command may cause the audio-input devices 102 to send the audio data to the remote system 108 and/or to analyze the audio data for acoustic events without detecting the wake word.

Determining when to cause the audio-input devices 102 to transition to a calibration mode may be based at least in part on one or more indications. For example, request data may be received from a given audio-input device 102, a user device 106, and/or a given audio-output device 104 for calibration of acoustic event detection to initiate. Such request data may include input data from a user utilizing a user device 106, input data from a user selecting a button 136 on the audio-output device 104, audio data representing a user utterance from a user of the audio-input device 102, etc. In other examples, initiation of acoustic event calibration may be based at least in part on the remote system 108 determining that the environment is in a condition for calibration to be initiated. For example, the remote system 108 may determine that the environment is unoccupied and/or that no sound and/or only ambient sound is present in the environment, such as for a given period of time. In these and other instances, the remote system 108 may determine that calibration of acoustic event detection may be initiated. It should be understood that calibration of acoustic event detection, including automatic initiation of such calibration, may be performed only in examples where user permission to do so has been provided.

In certain examples, the audio-output device 104 may be acquired in association with account data. For example, an online marketplace may be utilized to acquire the audio-output device 104, and a user account may be utilized during the acquisition. That account data, such as stored in the user registry 152, may indicate one or more audio-input devices 102 associated with the user account and/or one or more settings associated with the audio-input devices 102, such as settings indicating that the audio-input devices 102 have been configured to detect acoustic events and/or otherwise have been configured to "guard" an environment associated with the audio-input devices 102. In these examples, the remote system 108 may generate one or more notifications informing a user that calibration may be performed. User input may be provided indicating a desire to perform the calibration, and calibration may be initiated based at least in part on that input data.

Once the audio-input devices 102 have transitioned to a calibration mode, a given audio-output device 104 may be caused to emit sound corresponding to the acoustic event. In examples, the audio-output device 104 is a "smart" device configured to send and receive information, such as over a wireless network 110. In these examples, the remote system 108 may send another command to the audio-output device 104 to cause the audio-output device 104 to emit the sound. In other examples, the audio-output device 104 may not include communication means, and in these examples, the notification component 164 may generate and send a notification to the audio-output device 104, the audio-input device 102, and/or a user device 106 requesting that a user manually cause the audio-output device 104 to emit the sound. This may include, for example, the user pressing a button 136 designated as a "test" button or otherwise providing input to the audio-output device 104 in a way that causes the audio-output device 104 to emit sound.

Some or all of the audio-input devices 102 may capture the sound produced by the audio-output device 104 and may generate corresponding audio data. In examples where the audio-input devices 102 are configured with acoustic-event-detection models residing in memory 128 of the audio-input devices 102, the audio-input devices 102 may input audio data generated by their respective microphones 118 into the model(s). The model(s) may be utilized to detect the acoustic event and to generate a confidence value or other metric associated with detection of the acoustic event. Based at least in part on the audio-input device 102 being in the calibration mode, a weighted confidence value may be generated indicating more confidence that the audio data corresponds at least in part to the acoustic event. Additionally, in examples, an audio signature of the audio data may be stored in association with the audio-input device 102. The audio signature may be utilized as a reference audio signature for detecting subsequent acoustic events from sound captured by microphones 118 of the audio-input device 102. In this way, the audio-input device 102 may be calibrated to detect the sound as produced by the particular audio-output device 104 in the environment at issue. The same or a similar process may be perform for some or each of the audio-input devices 102 in the environment such that each device may be calibrated to detect the acoustic event associated with the audio-output device 104.

Additionally, the remote system 108 may be configured with acoustic-event-detection models 160. In examples, the models 160 residing at the remote system 108 may be more robust and/or may utilize more computing resources to determine if a given sample of audio data includes an acoustic event. These models 160 may be utilized to confirm the detection of acoustic events at the audio-input devices 102 and/or to determine that detection of an acoustic event at an audio-input device 102 is a false positive. The training component 162 may utilize the audio data and/or confidence values determined during calibration of acoustic event detection to train the acoustic-event-detection models 160, which may be utilized for a given user account and/or across multiple user accounts. For example, the audio signature of the audio data may be added to a repository of reference audio signatures associated with detection of an given event. Additionally, metadata associated with the devices at issue may be utilized to train one or more models 160 to more accurately detect the occurrence of an event. For example, the metadata may include location data, device-type data, spatial data, etc. In these examples, calibration of acoustic event detection from audio-output devices 104 associated with the same or similar metadata may be performed. For example, if calibration of acoustic event detection is performed on a given audio-output device 104 having a given device type, being associated with a given location, and/or being associated with spatial data indicating a given distance from an audio-input device 102, calibration of acoustic event detection from other audio-output devices 104 associated with similar metadata may be performed utilizing the calibration audio data.

Additionally, or alternatively, the processes described herein may be utilized to determine that one or more audio-input devices 102 are silenced such that a microphone 118 of a given audio-input device 102 is not capturing audio and/or generating audio data. For example, the remote system 108 may send a command to a given audio-input device 102 to send audio data corresponding to the sound emitted by the audio-output device 104. However, the audio-input device 102 may not send such audio data because the device is silenced. Based at least in part on not receiving audio data from the audio-output device 102, one or more notifications may be generated by the notification component 164 and sent to a user device 106. The notifications may indicate that the audio-input device 102 is silenced and may request that the user transition the audio-input device 102 so that it may be utilized for calibration and/or other purposes, such as detection of acoustic events when desired by the user. In other examples, during calibration for example, request data for a microphone state of a given audio-input device 102 may be sent to the audio-input device 102. The audio-input device 102 may respond to the request data by indicating whether the microphone 118 is silenced or operational. In examples where the response indicates the microphone 118 is silenced, the one or more notifications may be generated.

The location component 166 may be configured to determine a location of the various devices described herein and/or to determine a relative location of devices with respect to each other, including whether a given device is closer to a particular device or another device. For example, the user registry 152 may store, in association with account data: first data indicating a first device identifier of a first audio-output device; and second data indicating a second device identifier of a second audio-output device. For example, account data for a given user account may be stored in a user registry and may include data associated with devices associated with that account data. For example, the account data may indicate device identifiers of the various audio-input and audio-output devices associated with the user account. Details associated with the devices may also be stored in association with the account, such as characteristics of sounds produced by the audio-output devices and/or the acoustic-event-detection models associated with given audio-output devices.

The location component 166 may determine that a first location of the first audio-output device is closer to a second location of a first audio-input device than to a third location of a second audio-input device. For example, the locations of devices may be based at least in part on whether audio is received by the audio-input devices, the signal strength and/or other audio characteristics of the audio received at the audio-input devices, contextual information such as naming indicators associated with the devices, device affinities, image data, device beaconing, etc. In examples, determining the locations may include causing the first audio-output device to produce sound and receiving, from the first audio-input device, audio data representing the sound. A determination may be made that the second audio-input device failed to send the audio data representing the sound. In these examples, determining that the first location is closer to the second location than to the third location may be based at least in part on receiving the audio data from the first audio-input device and determining that the second audio-input device failed to send the audio data.

Additionally, or alternatively, determining the location may include causing the first audio-output device to produce sound and receiving, from the first audio-input device, first audio data representing the sound. Second audio data representing the sound may also be received from the second audio-input device. In these examples, determining that the first location is closer to the second location than to the third location may be in response to a first signal strength of the first audio data being stronger than a second signal strength of the second audio data.

Additionally, or alternatively, determining the location may include determining, from the account data, a first naming indicator associated with the first audio-output device, the first naming indicator including a first location reference. Determining the location may also include determining, from the account data, a second naming indicator associated with the first audio-input device, the second naming indicator including a second location reference. The location component 166 may determine that the first location reference corresponds to the second location reference. In these examples, determining that the first location is closer to the second location than to the third location may be in response to the first location reference corresponding to the second location reference.

In examples where there are multiple audio-output devices, the location component 166 may determine that a fourth location of the second audio-output device is closer to the third location than to the second location. Determining the device locations may be performed in the same or a similar manner as described above.

The model selector 168 may be configured to identify a first acoustic-event-detection model 160 associated with the first device identifier of the first audio-output device. For example, the account data may indicate one or more acoustic-event-detection models 160 associated with the first device identifier. In other examples, a database of models 160 may be queried utilizing the device identifier and/or other information associated with the audio-output device. In examples where multiple audio-output devices are associated with an environment, a model may be selected for each audio-output device and may be sent to the one or more audio-input devices.

The model selector 168 may also be configured to, in response to determining that the first location is closer to the second location than to the third location, configuring the first audio-input device to detect first acoustic events utilizing the first acoustic-event-detection model. For example, the audio-input device may be configured to store one or more acoustic-event-detection models, which may be utilized by a digital signal processor of the device to detect acoustic events. The selected acoustic-event-detection model may be sent to the audio-input device for storage and use by the device. The other audio-input devices may also be configured in a similar manner.

Utilizing the models 160 to detect an acoustic event, as discussed herein may be performed in multiple ways. For example, audio event detection (AED) aims to enable intelligent systems to understand the surrounding environment based on audio cues. Faster-RCNN (recurrent neural networks) may be utilized for AED, such as region-based convolutional network framework for visual object detection. Different from detecting visual objects from an image, which has no temporal information included, AED can take advantage of temporal contextual information from a spectrogram. Therefore, a recurrent layer is added on top of the convolutional network to capture the long-term temporal context from the extracted high-level features. By incorporating temporal context, R-CRNN may have better performance than the other region-based network for AED (R-FCN), which is a fully convolutional network without recurrent layers.

The R-CRNN consists of three modules: CRNN, region proposal network (RPN), and a final classifier. The first CRNN module extracts high-level features from the input spectrogram. The RPN computes event proposals based on the extracted features, and the classifier further refines the center/length of event proposals to generate audio event prediction. CRNN may take 30-second sound clips as input and extracts a high-level feature map. Each clip may be decomposed into a sequence of a certain period of time frames (e.g., 2,048 points sampled at 44.1 k Hz) with a 23 ms shift. A certain number of dimensional log filter bank energies (LFBEs) may be calculated for each frame, and the system may aggregate the LFBEs from all frames to generate the input spectrogram. The system may use residual network (ResNet) as the convolution network in CRNN, and there are two convolutional blocks in it. 2D convolutional kernels are used in CRNN, which generates a high-level feature map with time resolution of 186 ms (8× of the time resolution in the input spectrogram). The size of the high-level feature map is (162, 2U), where U is the number of units in the bi-directional GRU layer.

RPN may be used to generate event proposals (time intervals) for AED. While the original RPN generates region proposals in a 2-d search space (x, y axes in an image), we simplify it to generate event proposals in a 1-D search space (time axis only). By doing so, RPN takes a region of the high-level feature map generated by CRNN, and outputs a set of event proposals, where each proposal has a probability of containing audio events. We use RPN to quickly locate a vicinity of the event and reduce the number of intervals to be considered in the final classification.

A stripe window slides over the high-level feature and maps the window to a lower-dimensional (128-d) feature. The size of sliding window is 3*n, where n is the height of the high-level feature map (n=2U in our case). The receptive field of the sliding window is 557 ms (3×8×frame shift), but it can actually contain contextual information from intervals longer than 557 ms since the feature extractor CRNN has a recurrent layer.

At each frame of the high-level feature map, multiple regions of different sizes center around it. RPN takes anchor intervals with fixed sizes and then outputs k interval proposals by refining these anchor intervals at each frame. The fixed sizes of anchor intervals are {1,2,4,8,16,32} frames in the high-level feature map through our experiments. The 128-d feature of the sliding window at each location is fed to one dense layer (cls) to predict the probability of having an event (k scores), and another dense layer (reg) to encode the coordinates of interval proposals (2 k coordinates). Following the settings outlined above, these k proposals are parameterized by shifting and scaling relative to k anchor intervals.

For training RPN, each anchor interval is assigned to a ground-truth binary label that indicates containing target events or not. Similar to the cost function defined above, the cost function of RPN can be defined as:

$$L(\{p_i\},\{t_i\})=\Sigma_i L_{cls}(p_i,p_i^*)+\lambda\Sigma_i p_i^* L_{reg}(t_i,t_i^*) \qquad (1)$$

where i is the index of anchor interval, and pi is the predicted probability of containing target events for anchor i. If anchor interval i is highly overlapped with target events, the ground-truth label pi* is set to one. If not, pi* is set to zero. $L_{cls}$ is the cross entropy for binary classification. For the regression part, ti is a vector representing the two parameterized coordinates of the predicted interval proposal, and ti* is the vector of the groundtruth event interval assigned to a positive anchor. For Lreg, we use the robust loss function (smooth L1). λ is the coefficient to balance the classification error and regression error, and is set to one in all of our experiments. This multi-task cost function (1) optimizes binary classification and localization simultaneously.

After the interval proposals are available, the system uses non-maximum suppression (NMS) to remove highly overlapped proposals. In examples, 100 proposals based on their probability of containing audio events (cls) are selected to feed into the final classifier. The final classifier takes event proposals generated from RPN as input, and generates audio event predictions. A corresponding region of interest (RoI) on the high-level feature map is cropped for each event proposal. The cropped region is fed into a RoI pooling layer as proposed above to generate a fixed-length feature vector (7×n in our experiments). This fixed-length feature vector is fed into two dense layers (M nodes) with dropout rate 0.5, followed by two output layers, which produce the probability of containing the target event, and the regression to refine the center/length of the event. We use NMS again to remove highly overlapped events in these predictions. Also, events with probability lower than a pre-set threshold (0:8) will be removed at this stage. Since DCASE 2017 task 2 has an assumption that there is at most one event in each clip, only the event with the highest probability is kept in our experiments.

The system uses the same loss function (1) as RPN to train the final classifier, where the i in becomes the index of event proposals. This loss is used twice when training R-CRNN: one for RPN to identify the interval proposals, and one for the final classifier to predict audio events from event proposals. R-CRNN can be extended to detect different classes of events simultaneously within the same framework by adding more outputs to the final classifier. There is no change needed in RPN since it generates interval proposals agnostic to event classes. For adding an extra class, the number of extra parameters is 3M+3 (M+1 for the classification and 2M+2 for the localization), where M is the number of nodes in the dense layers of the final classifier.

As shown in FIG. 1, several of the components of the remote system 108 and the associated functionality of those components as described herein may be performed by the audio-input device 102, audio-output device 104, and/or the user device 106. Additionally, or alternatively, some or all of the components and/or functionalities associated with the audio-input device 102, the audio-output device 104, and/or the user device 106 may be performed by the remote system 108.

It should be noted that the exchange of data and/or information as described herein, and/or the performance of operations as described herein, may be performed only in situations where a user has provided consent for the exchange of such information and/or performance of such operations. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 124, 138, and/or the processor(s) described with respect to the components of the remote system 108, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 124, 138, and/or the processor(s) described with respect to the components of the remote system 108 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 124, 138, and/or the processor(s) described with respect to the components of the remote system 108 may possess its own local memory, which also may store program components, program data, and/or one or more operating systems.

The memory 116, 130, 142, and/or the memory described with respect to the components of the remote system 108 may include volatile and nonvolatile memory, removable and non-removable media implemented in any method or technology for storage of information, such as computer-readable instructions, data structures, program component, or other data. Such memory 116, 130, 142, and/or the memory described with respect to the components of the remote system 108 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 130, 142, and/or the memory described with respect to the components of the remote system 108 may be implemented as computer-readable storage media ("CRSM"), which may be any available physical media accessible by the processor(s) 112, 128, 138, and/or the processor(s) described with respect to the remote system 108 to execute instructions stored on the memory 116, 130, 142, and/or the memory described with respect to the components of the remote system 108. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 130, 142, and/or the memory described with respect to the components of the remote system 108, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 114, 126, 140, and/or the network interface(s) described with respect to the components of the remote system 108 may enable messages between the components and/or devices shown in system 100 and/or with one or more other polling systems, as well as other networked devices. Such network interface(s) 114, 126, 140, and/or the network interface(s) described with respect to the components of the remote system 108 may include one or more network interface controllers (NICs) or other types of transceiver devices to send and receive messages over the network 108.

For instance, each of the network interface(s) 114, 126, 140, and/or the network interface(s) described with respect to the components of the remote system 108 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 126, 140, and/or the network interface(s) described with respect to the components of the remote system 108 may include a wide area network (WAN) component to enable message over a wide area network.

In some instances, the remote system 108 may be local to an environment associated the audio-input devices 102. For instance, the remote system 108 may be located within one or more of the audio-input devices 102. In some instances, some or all of the functionality of the remote system 108 may be performed by one or more of the audio-input devices 102. Also, while various components of the remote system 108 have been labeled and named in this disclosure and each component has been described as being configured to cause the processor(s) to perform certain operations, it should be understood that the described operations may be performed by some or all of the components and/or other components not specifically illustrated.

Figure 2:
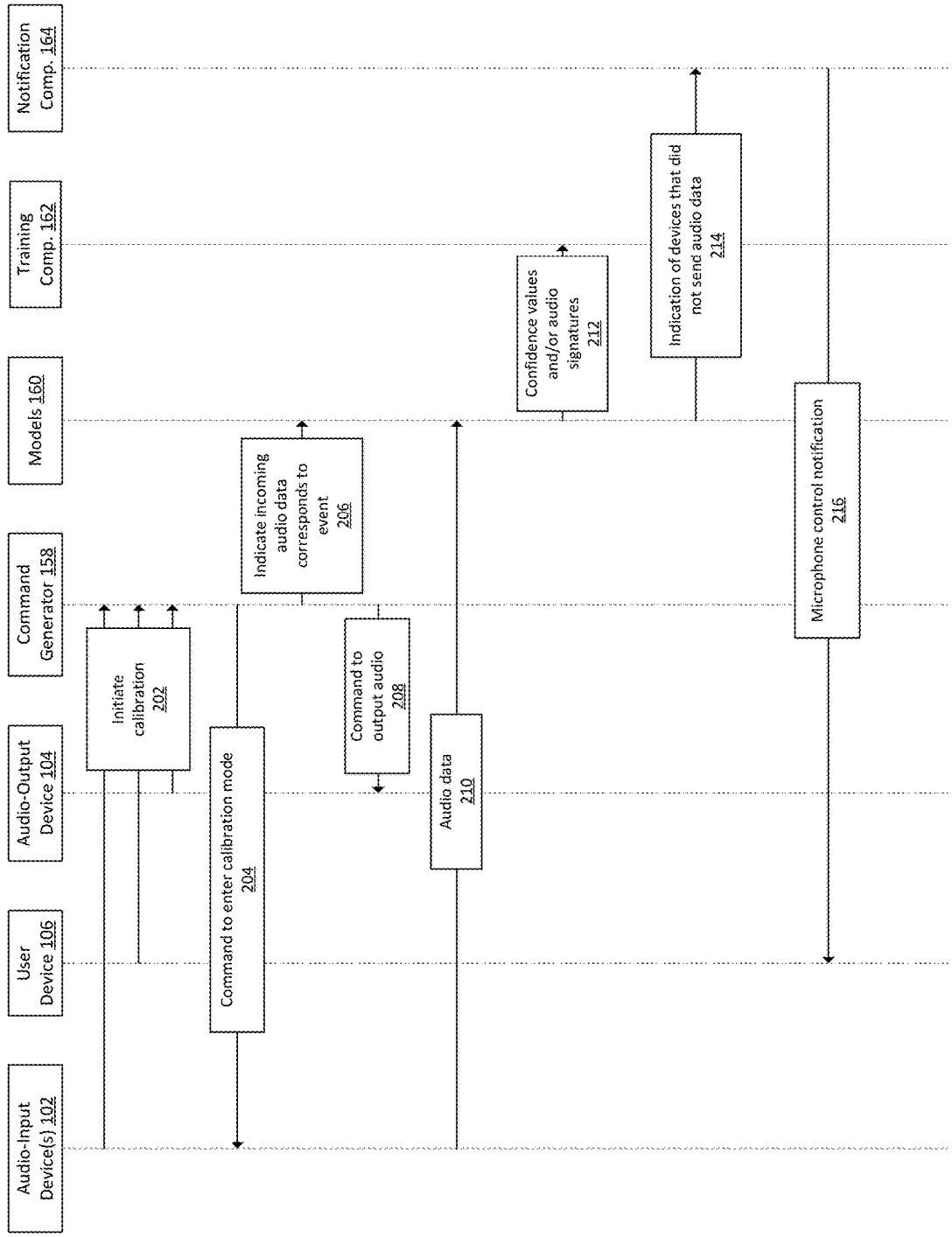
FIG. 2 illustrates a sequence diagram of an example flow of interactions arranged in a time sequence for acoustic event detection model selection.

FIG. 2 illustrates a sequence diagram of an example flow of interactions arranged in a time sequence for acoustic event detection model selection. It should be understood that while the sequence diagram 200 is described in a stepwise manner, some or all of the operations described with respect to FIG. 2 may be performed in a different order and/or in parallel.

At block 202, one or more devices may initiate calibration of acoustic event detection. Determining when to cause the audio-input devices 102 to transition to a calibration mode may be based at least in part on one or more indications. For example, request data may be received from a given audio-input device 102, a user device 106, and/or a given audio-output device 104 for calibration of acoustic event detection to initiate. Such request data may include input data from a user utilizing a user device 106, input data from a user selecting a button 136 on the audio-output device 104, audio data representing a user utterance from a user of the audio-input device 102, etc. In other examples, initiation of acoustic event calibration may be based at least in part on the remote system 108 determining that the environment is in a condition for calibration to be initiated. For example, the remote system 108 may determine that the environment is unoccupied and/or that no sound and/or only ambient sound is present in the environment, such as for a given period of time. In these and other instances, the remote system 108 may determine that calibration of acoustic event detection may be initiated. It should be understood that calibration of acoustic event detection, including automatic initiation of such calibration, may be performed only in examples where user permission to do so has been provided.

At block 204, the command processor 158 may generate and send a command to the audio-input device(s) 102 to enter a calibration mode. For example, the audio-input devices 102 associated with a given user account may be transitioned to a calibration mode. For example, account data may indicate one or more audio-input devices 102 associated with the user account. Those audio-input devices 102 may be configured to communicate with the remote system 108, and the command generator 158 may generate and send a command to some or all of the audio-input devices 102 instructing the audio-input devices 102 to transition to the calibration mode. The calibration mode may include causing the microphones 118 to be enabled for capturing audio from the environment. The calibration mode may alternatively include causing the audio-input devices 102 to generate and/or send audio data corresponding to captured audio to the remote system 108. For example, certain audio-input devices 102 may be "always on," such that a microphone 118 of a given audio-input device 102 continuously captures audio and generates audio data, but that audio data is not utilized until, for example, a wake word is detected. In these examples, the command may cause the audio-input devices 102 to send the audio data to the remote system 108 and/or to analyze the audio data for acoustic events without detecting the wake word.

In certain examples, the audio-output device 104 may be acquired in association with account data. For example, an online marketplace may be utilized to acquire the audio-output device 104, and a user account may be utilized during the acquisition. That account data, such as stored in a user registry, may indicate one or more audio-input devices 102 associated with the user account and/or one or more settings associated with the audio-input devices 102, such as settings indicating that the audio-input devices 102 have been configured to detect acoustic events and/or otherwise have been configured to "guard" an environment associated with the audio-input devices 102. In these examples, the remote system 108 may generate one or more notifications informing a user that calibration may be performed. User input may be provided indicating a desire to perform the calibration, and calibration may be initiated based at least in part on that input data.

At block 206, the command generator 158 may provide an indication to the model(s) 160 that incoming audio data associated with the audio-input devices 102 corresponds to an acoustic event. This indication may provide the model(s) 160 with a ground truth that audio data received from the audio-input devices 102 corresponds at least in part to sound that includes the acoustic event.

At block 208, the command generator 158 may generate and send a command to the audio-output device 104 to output audio corresponding to the acoustic event. For example, once the audio-input devices 102 have transitioned to a calibration mode, a given audio-output device 104 may be caused to emit sound corresponding to the acoustic event. In examples, the audio-output device 104 is a "smart" device configured to send and receive information, such as over a wireless network 110. In these examples, the remote system 108 may send another command to the audio-output device 104 to cause the audio-output device 104 to emit the sound. In other examples, the audio-output device 104 may not include communication means, and in these examples, the notification component 164 may generate and send a notification to the audio-output device 104, the audio-input device 102, and/or a user device 106 requesting that a user manually cause the audio-output device 104 to emit the sound. This may include, for example, the user pressing a button 136 designated as a "test" button or otherwise providing input to the audio-output device 104 in a way that causes the audio-output device 104 to emit sound.

At block 210, the audio-input device(s) 102 may generate and send audio data corresponding to audio received from the environment to the model(s) 160. Some or all of the audio-input devices 102 may capture the sound produced by the audio-output device 104 and may generate corresponding audio data. In examples where the audio-input devices 102 are configured with acoustic-event-detection models residing in memory of the audio-input devices 102, the audio-input devices 102 may input audio data generated by their respective microphones into the model(s). The model(s) may be utilized to detect the acoustic event and to generate a confidence value or other metric associated with detection of the acoustic event. Based at least in part on the audio-input device 102 being in the calibration mode, a weighted confidence value may be generated indicating more confidence that the audio data corresponds at least in part to the acoustic event. Additionally, in examples, an audio signature of the audio data may be stored in association with the audio-input device 102. The audio signature may be utilized as a reference audio signature for detecting subsequent acoustic events from sound captured by microphones of the audio-input device 102. In this way, the audio-input device 102 may be calibrated to detect the sound as produced by the particular audio-output device 104 in the environment at issue. The same or a similar process may be perform for some or each of the audio-input devices 102 in the environment such that each device may be calibrated to detect the acoustic event associated with the audio-output device 104.

At block 212, the model(s) 160 may detect the acoustic event and may generate confidence values associated with the detection of the acoustic event. In examples, the models 160 residing at the remote system 108 may be more robust and/or may utilize more computing resources to determine if a given sample of audio data includes an acoustic event. These models 160 may be utilized to confirm the detection of acoustic events at the audio-input devices 102 and/or to determine that detection of an acoustic event at an audio-input device 102 is a false positive. The training component 162 may utilize the audio data and/or confidence values determined during calibration of acoustic event detection to train the acoustic-event-detection models 160, which may be utilized for a given user account and/or across multiple user accounts. For example, the audio signature of the audio data may be added to a repository of reference audio signatures associated with detection of an given event. Additionally, metadata associated with the devices at issue may be utilized to train one or more models 160 to more accurately detect the occurrence of an event. For example, the metadata may include location data, device-type data, spatial data, etc. In these examples, calibration of acoustic event detection from audio-output devices 104 associated with the same or similar metadata may be performed. For example, if calibration of acoustic event detection is performed on a given audio-output device 104 having a given device type, being associated with a given location, and/or being associated with spatial data indicating a given distance from an audio-input device 102, calibration of acoustic event detection from other audio-output devices 104 associated with similar metadata may be performed utilizing the calibration audio data. Thereafter, having trained a model based at least in part on the particular sound produced by the audio-output device 104, a model selector may be configured to identify a first acoustic-event-detection model associated with the first device identifier of the first audio-output device. For example, the account data may indicate one or more acoustic-event-detection models associated with the first device identifier. In other examples, a database of models may be queried utilizing the device identifier and/or other information associated with the audio-output device. In examples where multiple audio-output devices are associated with an environment, a model may be selected for each audio-output device and may be sent to the one or more audio-input devices.

The model selector may also be configured to, in response to determining that the first location is closer to the second location than to the third location, configuring the first audio-input device to detect first acoustic events utilizing the first acoustic-event-detection model. For example, the audio-input device may be configured to store one or more acoustic-event-detection models, which may be utilized by a digital signal processor of the device to detect acoustic events. The selected acoustic-event-detection model may be sent to the audio-input device for storage and use by the device. The other audio-input devices may also be configured in a similar manner.

At block 214, the model(s) 160 may optionally provide an indication to a notification component 164 of devices that did not send audio data. For example, the processes described herein may be utilized to determine that one or more audio-input devices 102 are silenced such that a microphone of a given audio-input device 102 is not capturing audio and/or generating audio data. For example, the remote system 108 may send a command to a given audio-input device 102 to send audio data corresponding to the sound emitted by the audio-output device 104. However, the audio-input device 102 may not send such audio data because the device is silenced.

At block 216, the notification component 164 may generate and send a notification of microphone control of given devices, such as to the user device 106. Based at least in part on not receiving audio data from the audio-output device 102, one or more notifications may be generated by the notification component 164 and sent to a user device 106. The notifications may indicate that the audio-input device 102 is, for example, silenced and may request that the user transition the audio-input device 102 so that it may be utilized for calibration and/or other purposes, such as detection of acoustic events when desired by the user. In other examples, during calibration for example, request data for a microphone state of a given audio-input device 102 may be sent to the audio-input device 102. The audio-input device 102 may respond to the request data by indicating whether the microphone is silenced or operational. In examples where the response indicates the microphone is silenced, the one or more notifications may be generated.

Figure 3:
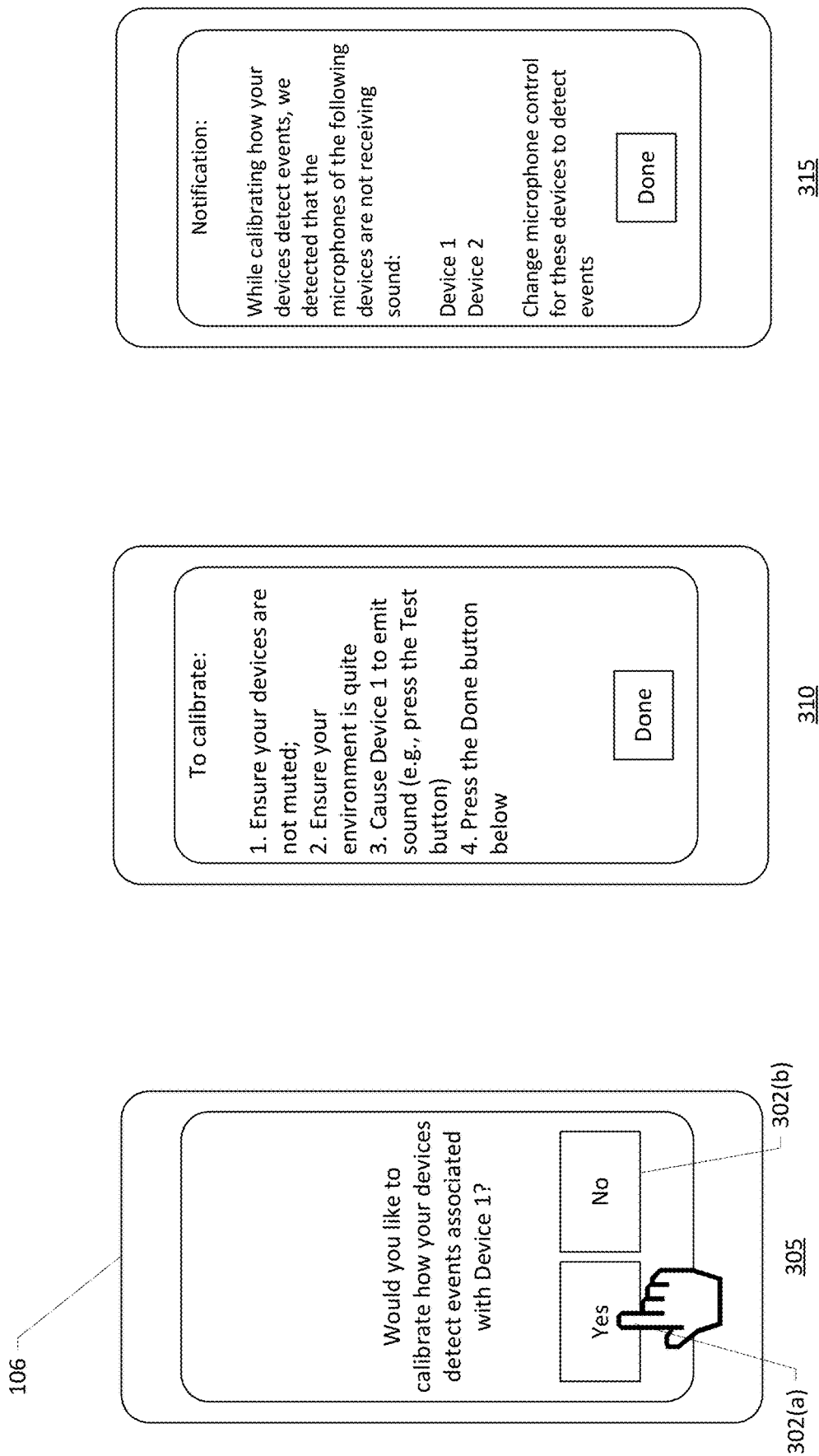
FIG. 3A illustrates an example user interface for initiating acoustic event detection model selection.
FIG. 3B illustrates an example user interface for providing instructions associated with acoustic event calibration.
FIG. 3C illustrates an example user interface for displaying a notification indicating that one or more audio-input devices are silenced.

FIG. 3A illustrates an example user interface 305 for initiating acoustic event calibration. The user interface 305 may be caused to be displayed on a user device 106, such as the user device 106 described with respect to FIG. 1.

The user interface 305 may display a request to initiate calibration of acoustic event detection. Generation of the notification may be based at least in part on an audio-output device being acquired in association with account data associated with the user device 106, periodic and/or scheduled calibration requests, and/or in response to user input on the user device 106. The user interface 305 may provide an indication of the audio-output device that will output the sound and may provide selectable portions 302(*a*), 302(*b*) to allow the user to provide user input to confirm that calibration should be initiated or to reject the option to initiate calibration.

FIG. 3B illustrates an example user interface 310 for providing instructions associated with acoustic event calibration. The user interface 310 may be caused to be displayed on a user device 106, such as the user device 106 described with respect to FIG. 1.

The user interface 310 may be caused to be displayed based at least in part on the user selecting the selectable portion 302(*a*) of the user interface 305. Additionally, the user interface 310 may be displayed in situations where the audio-output device is not a "smart" device or otherwise does not include communication means with other devices and/or the remote system. In these examples, to cause the audio-output device to emit sound, the user may manually cause the device to emit sound, such as by pressing a button designated for the output of sound. In these examples, the user interface 310 may display one or more instructions for a user to follow to ensure calibration of acoustic event detection occurs under optimal conditions. The instructions may include ensuring the audio-input devices are not silenced, ensuring the environment is quite, causing the audio-output device to emit sound, and providing user input when the instructions have been completed. The user input may be a selection of a portion of a screen of the user device 106 indicating that the instructions have been completed.

FIG. 3C illustrates an example user interface 315 for displaying a notification indicating microphone control of one or more audio-input devices. The user interface 315 may be caused to be displayed on a user device 106, such as the user device 106 described with respect to FIG. 1.

The user interface 315 may be caused to be displayed based at least in part on the system determining that at least one of the audio-input devices is in a silenced mode. For example, the processes described herein may be utilized to determine that one or more audio-input devices are silenced such that a microphone of a given audio-input device is not capturing audio and/or generating audio data. For example, the remote system may send a command to a given audio-input device to send audio data corresponding to the sound emitted by the audio-output device. However, the audio-input device may not send such audio data because the device is silenced.

A notification component may generate and send a notification of the silenced devices, such as to the user device. Based at least in part on not receiving audio data from the audio-output device, one or more notifications may be generated by the notification component and sent to a user device. The notifications may indicate that the audio-input device is silenced and may request that the user transition the audio-input device so that it may be utilized for calibration and/or other purposes, such as detection of acoustic events when desired by the user. In other examples, during calibration for example, request data for a microphone state of a given audio-input device may be sent to the audio-input device. The audio-input device may respond to the request data by indicating whether the microphone is silenced or operational. In examples where the response indicates the microphone is silenced, the one or more notifications may be generated.

Figure 4:
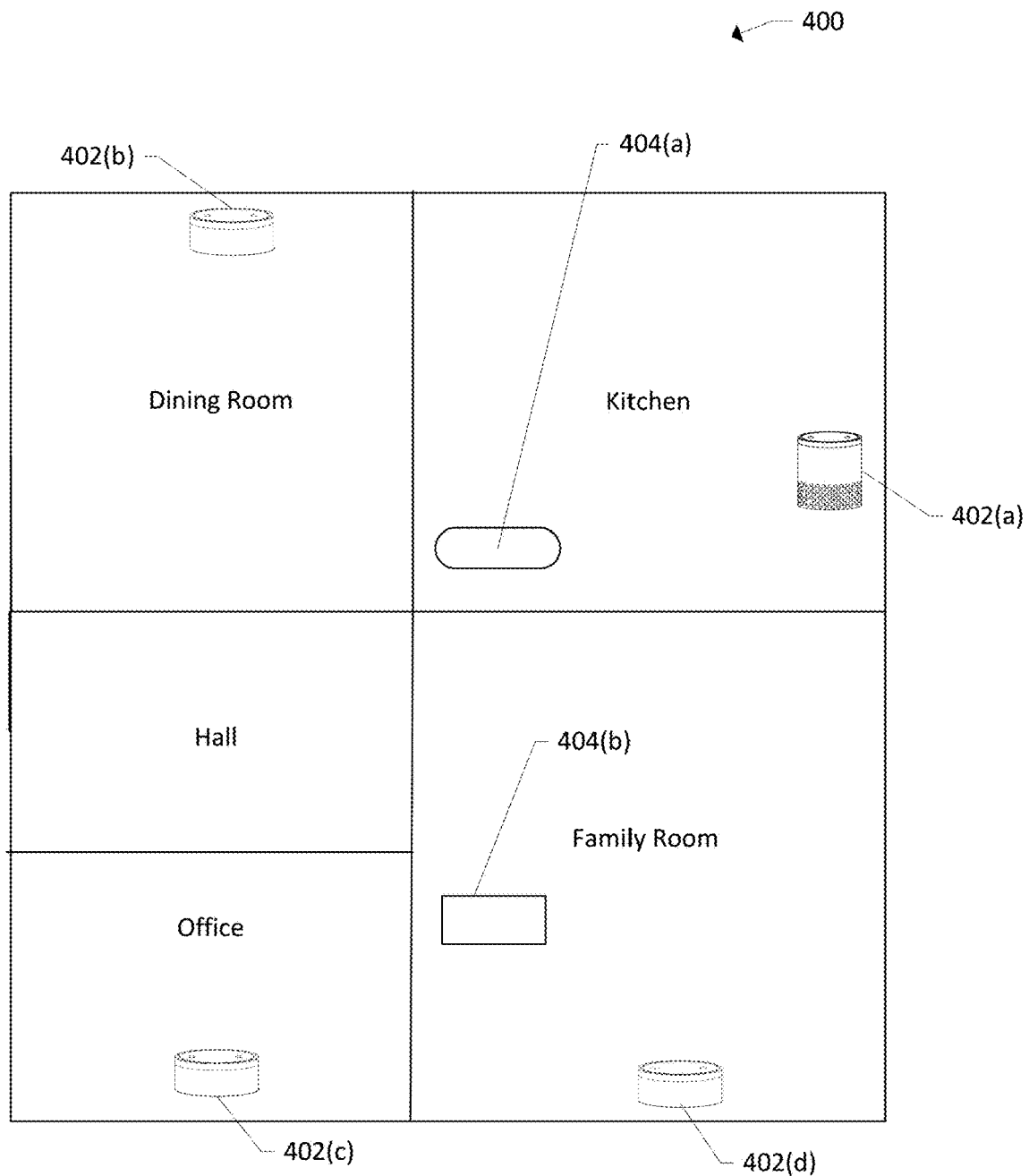
FIG. 4 illustrates a schematic diagram of an example environment that includes audio-input devices and audio-output devices.

FIG. 4 illustrates a schematic diagram of an example environment that includes audio-input devices 402(*a*)-(*d*) and audio-output devices 404(*a*)-(*b*). The audio-input devices 402(*a*)-(*d*) may have the same or similar components and/or may perform the same or similar functionality as the audio-input devices 102 described with respect to FIG. 1. The audio-output devices 404(*a*)-(*b*) may have the same or similar components and/or may perform the same or similar functionality as the audio-output devices 104 described with respect to FIG. 1.

As shown in FIG. 4, a given audio-output device 404 may be situated nearer to some audio-input devices 402(*a*) than to other audio-input devices 402(*b*)-(*d*). When commands are sent to the audio-input devices 402(*a*)-(*d*) to transition to a calibration mode, all of the audio-input devices 402(*a*)-(*d*) may begin receiving audio, generating audio data, and sending the audio data to a remote system. In certain examples, some of the audio-input devices may be expected to receive audio from the output sound while other audio-input devices, such as those in another room or those that are far away from the audio-output device may not. Data associated with the placement of audio-input devices 402(*a*)-(*d*) within an environment may be utilized to inform this determination. For example, the naming indicators associated with the audio-input devices 402(*a*)-(*d*) and/or the audio-output device 404 may be utilized such that devices having the same or similar naming indicators are more closely associated than those devices with different naming indicators. Additional information such as device-affinity data indicating a frequency of communications between devices may be utilized to approximate distances and/or relationships between devices. Some or all of this information may be utilized to determine which audio-input devices to send calibration commands to, which devices to expect audio data from, identifying expected audio data characteristics, etc.

Additionally, a location component may be configured to determine a location of the various devices described herein and/or to determine a relative location of devices with respect to each other, including whether a given device is closer to a particular device or another device. For example, the user registry may store, in association with account data: first data indicating a first device identifier of a first audio-output device 404(*a*); and second data indicating a second device identifier of a second audio-output device 404(*b*). For example, account data for a given user account may be stored in a user registry and may include data associated with devices associated with that account data. For example, the account data may indicate device identifiers of the various audio-input 402(*a*)-(*d*) and audio-output devices 404(*a*)-(*b*) associated with the user account. Details associated with the devices may also be stored in association with the account, such as characteristics of sounds produced by the audio-output devices 404(a)-(b) and/or the acoustic-event-detection models associated with given audio-output devices 404(a)-(b).

The location component may determine that a first location of the first audio-output device 404(a) is closer to a second location of a first audio-input device 402(a) than to a third location of a second audio-input device 402(b). For example, the locations of devices may be based at least in part on whether audio is received by the audio-input devices 402(a)-(b), the signal strength and/or other audio characteristics of the audio received at the audio-input devices 402(a)-(b), contextual information such as naming indicators associated with the devices, device affinities, image data, device beaconing, etc. In examples, determining the locations may include causing the first audio-output device 404(a) to produce sound and receiving, from the first audio-input device 402(a), audio data representing the sound. A determination may be made that the second audio-input device 402(b) failed to send the audio data representing the sound. In these examples, determining that the first location is closer to the second location than to the third location may be based at least in part on receiving the audio data from the first audio-input device 402(a) and determining that the second audio-input device 402(b) failed to send the audio data.

Additionally, or alternatively, determining the location may include causing the first audio-output device 404(a) to produce sound and receiving, from the first audio-input device 402(a), first audio data representing the sound. Second audio data representing the sound may also be received from the second audio-input device 402(b). In these examples, determining that the first location is closer to the second location than to the third location may be in response to a first signal strength of the first audio data being stronger than a second signal strength of the second audio data.

Additionally, or alternatively, determining the location may include determining, from the account data, a first naming indicator associated with the first audio-output device 402(a), the first naming indicator including a first location reference. Determining the location may also include determining, from the account data, a second naming indicator associated with the first audio-input device 402(a), the second naming indicator including a second location reference. The location component may determine that the first location reference corresponds to the second location reference. In these examples, determining that the first location is closer to the second location than to the third location may be in response to the first location reference corresponding to the second location reference.

In examples where there are multiple audio-output devices, the location component 166 may determine that a fourth location of the second audio-output device is closer to the third location than to the second location. Determining the device locations may be performed in the same or a similar manner as described above.

The model selector may be configured to identify a first acoustic-event-detection model associated with the first device identifier of the first audio-output device. For example, the account data may indicate one or more acoustic-event-detection models associated with the first device identifier. In other examples, a database of models may be queried utilizing the device identifier and/or other information associated with the audio-output device. In examples where multiple audio-output devices are associated with an environment, a model may be selected for each audio-output device and may be sent to the one or more audio-input devices.

The model selector may also be configured to, in response to determining that the first location is closer to the second location than to the third location, configuring the first audio-input device to detect first acoustic events utilizing the first acoustic-event-detection model. For example, the audio-input device may be configured to store one or more acoustic-event-detection models, which may be utilized by a digital signal processor of the device to detect acoustic events. The selected acoustic-event-detection model may be sent to the audio-input device for storage and use by the device. The other audio-input devices may also be configured in a similar manner.

Figure 5:
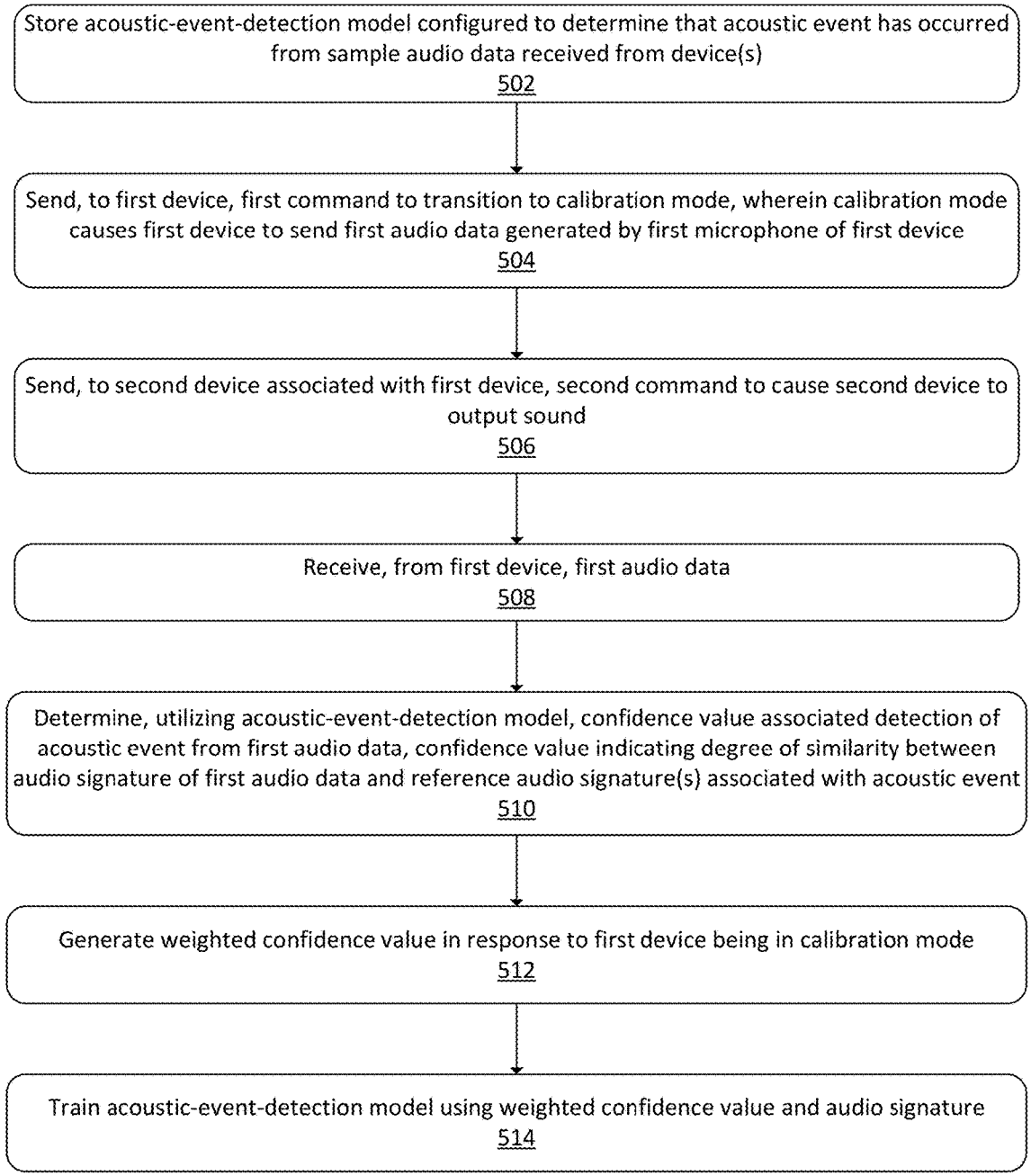
FIG. 5 illustrates a flow diagram of an example process for acoustic event detection.
Figure 6:
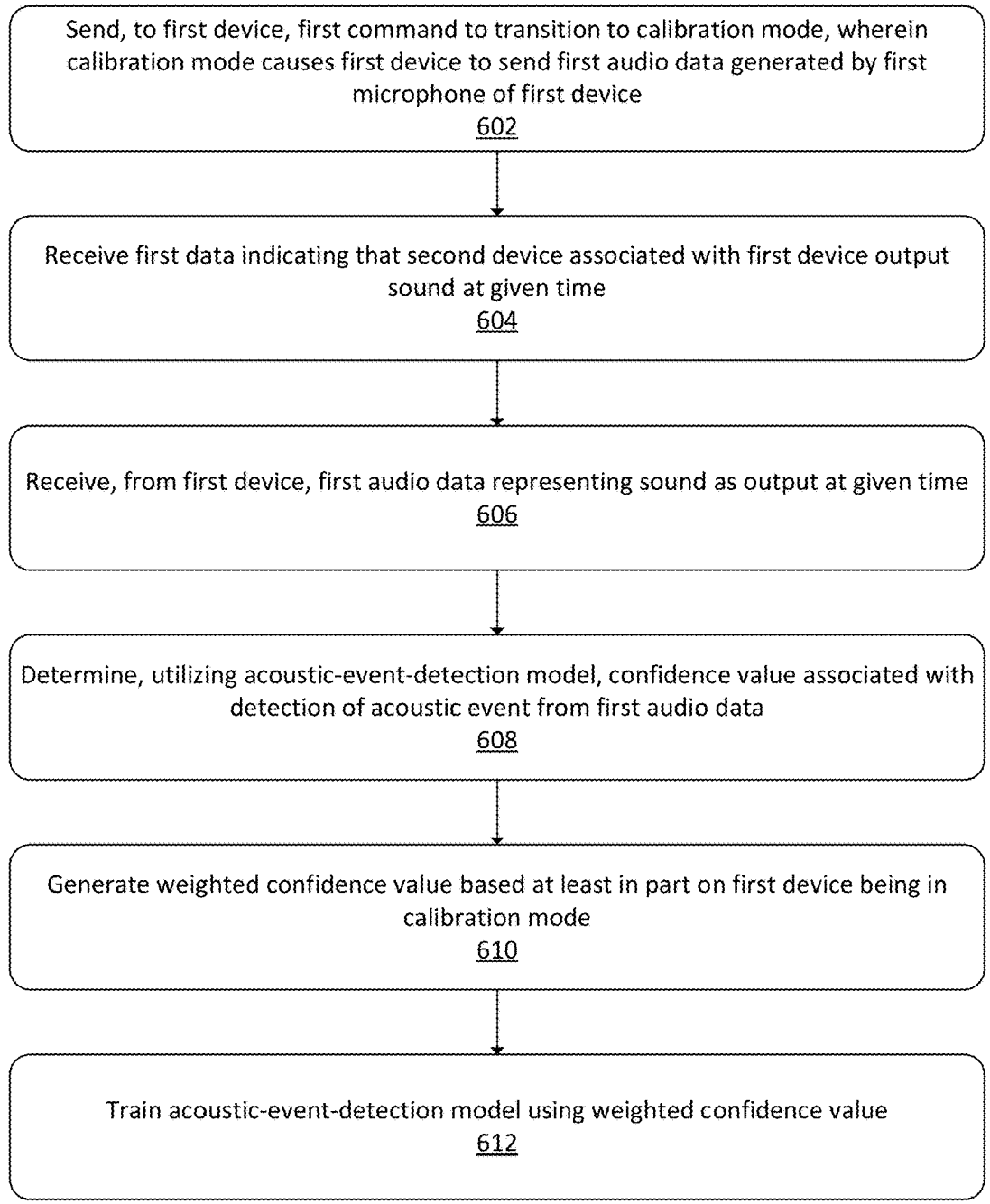
FIG. 6 illustrates a flow diagram of another example process for acoustic event detection.

FIGS. 5 and 6 illustrates processes for acoustic event detection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 7-9, although the processes may be implemented in a wide variety of other environments, architectures and systems.

FIG. 5 illustrates a flow diagram of an example process 500 for acoustic event calibration. The order in which the operations or steps are described is not intended to be construed as a limitation, and any number of the described operations may be combined in any order and/or in parallel to implement process 500.

At block 502, the process 500 may include storing an acoustic-event-detection model configured to determine that an acoustic event has occurred from sample audio data received from one or more devices. The model may be trained to detect one or more acoustic events based on reference audio signatures of the acoustic event. One or more of the components described herein may utilize one or more models to perform the actions described with respect to those components. A model may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning. The predictive analytic techniques may be utilized to determine associations and/or relationships between explanatory variables and predicted variables from past occurrences and utilizing these variables to predict an unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. By so doing, a predictive model generator may utilize data from various data stores, as well as sample data, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence.

At block 504, the process 500 may include sending, to a first device, a first command to transition to a calibration mode, wherein the calibration mode causes the first device to send first audio data generated by a first microphone of the first device. For example, the first device may be an audio-input device associated with a given user account. For example, account data may indicate one or more audio-input devices associated with the user account. Those audio-input devices may be configured to communicate with the remote system, and a command generator may generate and send a command to some or all of the audio-input devices instructing the audio-input devices to transition to the calibration mode. The calibration mode may include causing the microphones to be enabled for capturing audio from the environment. The calibration mode may alternatively include causing the audio-input devices to generate and/or send audio data corresponding to captured audio to the remote system. For example, certain audio-input devices may be "always on," such that a microphone of a given audio-input device continuously captures audio and generates audio data, but that audio data is not utilized until, for example, a wake word is detected. In these examples, the command may cause the audio-input devices to send the audio data to the remote system and/or to analyze the audio data for acoustic events without detecting the wake word.

In certain examples, the audio-output device may be acquired in association with account data. For example, an online marketplace may be utilized to acquire the audio-output device, and a user account may be utilized during the acquisition. That account data, such as stored in a user registry, may indicate one or more audio-input devices associated with the user account and/or one or more settings associated with the audio-input devices, such as settings indicating that the audio-input devices have been configured to detect acoustic events and/or otherwise have been configured to "guard" an environment associated with the audio-input devices. In these examples, the remote system may generate one or more notifications informing a user that calibration may be performed. User input may be provided indicating a desire to perform the calibration, and calibration may be initiated based at least in part on that input data.

At block 506, the process 500 may include sending, to a second device associated with the first device, a second command to cause the second device to output sound. For example, a command generator may generate and send a command to the audio-output device to output audio corresponding to the acoustic event. For example, once the audio-input devices have transitioned to a calibration mode, a given audio-output device may be caused to emit sound corresponding to the acoustic event. In examples, the audio-output device is a "smart" device configured to send and receive information, such as over a wireless network. In these examples, the remote system may send another command to the audio-output device to cause the audio-output device to emit the sound. In other examples, the audio-output device may not include communication means, and in these examples, the notification component may generate and send a notification to the audio-output device, the audio-input device, and/or a user device requesting that a user manually cause the audio-output device to emit the sound. This may include, for example, the user pressing a button designated as a "test" button or otherwise providing input to the audio-output device in a way that causes the audio-output device to emit sound.

At block 508, the process 500 may include receiving, from the first device, the first audio data representing the sound. For example, the audio-input device(s) may generate and send audio data corresponding to audio received from the environment to the model(s). Some or all of the audio-input devices may capture the sound produced by the audio-output device and may generate corresponding audio data. In examples where the audio-input devices are configured with acoustic-event-detection models residing in memory of the audio-input devices, the audio-input devices may input audio data generated by their respective microphones into the model(s). The model(s) may be utilized to detect the acoustic event and to generate a confidence value or other metric associated with detection of the acoustic event. Based at least in part on the audio-input device being in the calibration mode, a weighted confidence value may be generated indicating more confidence that the audio data corresponds at least in part to the acoustic event. Additionally, in examples, an audio signature of the audio data may be stored in association with the audio-input device. The audio signature may be utilized as a reference audio signature for detecting subsequent acoustic events from sound captured by microphones of the audio-input device. In this way, the audio-input device may be calibrated to detect the sound as produced by the particular audio-output device in the environment at issue. The same or a similar process may be perform for some or each of the audio-input devices in the environment such that each device may be calibrated to detect the acoustic event associated with the audio-output device.

At block 510, the process 500 may include determining, utilizing the acoustic-event-detection model, a confidence value associated with detection of the acoustic event from the first audio data, the confidence value indicating a degree of similarity between an audio signature of the first audio data and one or more reference audio signatures associated with the acoustic event. In examples, acoustic event detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to an acoustic event.

At block 512, the process 500 may include generating a weighted confidence value in response to the first device being in the calibration mode. Based at least in part on the audio-input device being in the calibration mode, a weighted confidence value may be generated indicating more confidence that the audio data corresponds at least in part to the acoustic event. For example, the confidence value determined utilizing the model may be 0.7 on a scale of 0 to 1.0. The weighted confidence value may be 0.9 or greater based at least in part on the system determining that the audio data corresponds to a ground truth that the acoustic event occurred.

At block 514, the process 500 may include training the acoustic-event-detection model using the weighted confidence value and the audio signature. For example, the audio signature may be added to reference audio signatures used to compare with sample audio signatures. Additionally, or alternatively, the weighted confidence values may be utilized to determine which reference audio signatures are used for comparison and/or for determining the confidence value of a subsequent detection of an acoustic event.

Additionally, or alternatively, the process 500 may include receiving first data indicating that the second device was acquired in association with account data, wherein the account data indicates that a device identifier of the first device is associated with the account data. The process 500 may also include generating request data for user input to initiate acoustic event calibration with the second device. The process 500 may also include sending the request data to a third device associated with the account data. In these examples, sending the first command to the first device may be in response to receiving input data corresponding to the user input.

Additionally, or alternatively, the process 500 may include storing first data indicating a device type associated with the one or more reference audio signatures. The process 500 may also include receiving second data indicating the second device is associated with the device type. In these examples, training the acoustic-event-detection model may comprise including the audio signature in the one or more reference audio signatures in response to the second data.

Additionally, or alternatively, the process 500 may include determining, from account data, a third device that is associated with the first device, the third device including a second microphone. The process 500 may also include sending an instance of the first command to the third device. The process 500 may also include determining that the third device failed to send second audio data corresponding to the sound. The process 500 may also include determining, in response to determining that the third device failed to send the second audio data, that the third device has been silenced such that the microphone is configured to refrain from generating the second audio data. The process 500 may also include generating notification data indicating that the third device is silenced and sending the notification data to a user device associated with the account data.

FIG. 6 illustrates a flow diagram of another example process 600 for acoustic event calibration. The order in which the operations or steps are described is not intended to be construed as a limitation, and any number of the described operations may be combined in any order and/or in parallel to implement process 600.

At block 602, the process 600 may include sending, to a first device, a first command to transition to a calibration mode, wherein the calibration mode causes the first device to send first audio data generated by a first microphone of the first device. For example, the first device may be an audio-input device associated with a given user account. For example, account data may indicate one or more audio-input devices associated with the user account. Those audio-input devices may be configured to communicate with the remote system, and a command generator may generate and send a command to some or all of the audio-input devices instructing the audio-input devices to transition to the calibration mode. The calibration mode may include causing the microphones to be enabled for capturing audio from the environment. The calibration mode may alternatively include causing the audio-input devices to generate and/or send audio data corresponding to captured audio to the remote system. For example, certain audio-input devices may be "always on," such that a microphone of a given audio-input device continuously captures audio and generates audio data, but that audio data is not utilized until, for example, a wake word is detected. In these examples, the command may cause the audio-input devices to send the audio data to the remote system and/or to analyze the audio data for acoustic events without detecting the wake word.

In certain examples, the audio-output device may be acquired in association with account data. For example, an online marketplace may be utilized to acquire the audio-output device, and a user account may be utilized during the acquisition. That account data, such as stored in a user registry, may indicate one or more audio-input devices associated with the user account and/or one or more settings associated with the audio-input devices, such as settings indicating that the audio-input devices have been configured to detect acoustic events and/or otherwise have been configured to "guard" an environment associated with the audio-input devices. In these examples, the remote system may generate one or more notifications informing a user that calibration may be performed. User input may be provided indicating a desire to perform the calibration, and calibration may be initiated based at least in part on that input data.

At block 604, the process 600 may include receiving first data indicating that a second device associated with the first device output sound at a given time. For example, a command generator may generate and send a command to the audio-output device to output audio corresponding to the acoustic event. For example, once the audio-input devices have transitioned to a calibration mode, a given audio-output device may be caused to emit sound corresponding to the acoustic event. In examples, the audio-output device is a "smart" device configured to send and receive information, such as over a wireless network. In these examples, the remote system may send another command to the audio-output device to cause the audio-output device to emit the sound. In other examples, the audio-output device may not include communication means, and in these examples, the notification component may generate and send a notification to the audio-output device, the audio-input device, and/or a user device requesting that a user manually cause the audio-output device to emit the sound. This may include, for example, the user pressing a button designated as a "test" button or otherwise providing input to the audio-output device in a way that causes the audio-output device to emit sound.

At block 606, the process 600 may include receiving, from the first device, the first audio data representing the sound as output at the given time. For example, the audio-input device(s) may generate and send audio data corresponding to audio received from the environment to the model(s). Some or all of the audio-input devices may capture the sound produced by the audio-output device and may generate corresponding audio data. In examples where the audio-input devices are configured with acoustic-event-detection models residing in memory of the audio-input devices, the audio-input devices may input audio data generated by their respective microphones into the model(s). The model(s) may be utilized to detect the acoustic event and to generate a confidence value or other metric associated with detection of the acoustic event. Based at least in part on the audio-input device being in the calibration mode, a weighted confidence value may be generated indicating more confidence that the audio data corresponds at least in part to the acoustic event. Additionally, in examples, an audio signature of the audio data may be stored in association with the audio-input device. The audio signature may be utilized as a reference audio signature for detecting subsequent acoustic events from sound captured by microphones of the audio-input device. In this way, the audio-input device may be calibrated to detect the sound as produced by the particular audio-output device in the environment at issue. The same or a similar process may be perform for some or each of the audio-input devices in the environment such that each device may be calibrated to detect the acoustic event associated with the audio-output device.

At block 608, the process 600 may include determining, utilizing an acoustic-event-detection model, a confidence value associated with detection of the acoustic event from the first audio data. In examples, acoustic event detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to an acoustic event.

At block 610, the process 600 may include generating a weighted confidence value based at least in part on the first device being in the calibration mode. Based at least in part on the audio-input device being in the calibration mode, a weighted confidence value may be generated indicating more confidence that the audio data corresponds at least in part to the acoustic event. For example, the confidence value determined utilizing the model may be 0.7 on a scale of 0 to 1.0. The weighted confidence value may be 0.9 or greater based at least in part on the system determining that the audio data corresponds to a ground truth that the acoustic event occurred.

At block 612, the process 600 may include training the acoustic-event-detection model using the weighted confidence value. For example, the audio signature may be added to reference audio signatures used to compare with sample audio signatures. Additionally, or alternatively, the weighted confidence values may be utilized to determine which reference audio signatures are used for comparison and/or for determining the confidence value of a subsequent detection of an acoustic event.

Additionally, or alternatively, the process 600 may include receiving first data indicating that the first device is associated with account data. The process 600 may also include receiving second data indicating that the second device is associated with the account data. The process 600 may also include generating, based at least in part on the first data and the second data, request data for user input to initiate acoustic event calibration with the second device. The process 600 may also include sending the request data to a third device associated with the account data. In these examples, sending the first command to the first device may be based at least in part on receiving input data corresponding to the user input.

Additionally, or alternatively, the process 600 may include storing first data indicating a device type associated with one or more reference audio signatures. The process 600 may also include receiving second data indicating the second device is associated with the device type. The process 600 may also include training the acoustic-event-detection model by including an audio signature of the first audio data in the one or more reference audio signatures based at least in part on the second data.

Additionally, or alternatively, the process 600 may include determining, from account data, a third device associated with the first device, the third device including a second microphone. The process 600 may also include sending an instance of the first command to the third device. The process 600 may also include determining that the third device failed to send second audio data. The process 600 may also include determining, based at least in part on determining that the third device failed to send the second audio data, that the third device has been silenced. The process 600 may also include sending notification data to a user device associated with the account data, the notification data indicating that the third device is silenced.

Additionally, or alternatively, the process 600 may include determining, from account data, a third device associated with the first device, the third device including a second microphone. The process 600 may also include sending request data to the third device for an indication of a microphone status of the third device. The process 600 may also include receiving, from the third device, first data indicating that the microphone status is silenced. The process 600 may also include sending notification data to a user device associated with the account data, the notification data indicating that the third device is silenced.

Additionally, or alternatively, the process 600 may include storing first data indicating a geographic location associated with one or more reference audio signatures utilized by the acoustic-event-detection model. The process 600 may also include receiving second data indicating the second device is associated with the geographic location. The process 600 may also include training the acoustic-event-detection model by including an audio signature of the first audio data in the one or more reference audio signatures based at least in part on the second data.

Additionally, or alternatively, the process 600 may include receiving input data indicating a request to initiate acoustic event calibration in association with the second device. The process 600 may also include determining that the second device is configured to wirelessly communicate with a remote system. The process 600 may also include sending, from the remote system, a second command to the second device to cause the second device to output the sound. In these examples, receiving the first data may be based at least in part on sending the second command.

Additionally, or alternatively, the process 600 may include receiving input data indicating a request to initiate acoustic event calibration with the second device. The process 600 may also include determining that wireless communication with the second device is absent. The process 600 may also include generating, based at least in part on determining that the wireless communication with the second device is absent, request data for a user to manually cause the second device to output the sound. The process 600 may also include sending the request data to a user device associated with the first device. In these examples, receiving the first data may be based at least in part on sending the request data.

Figure 7:
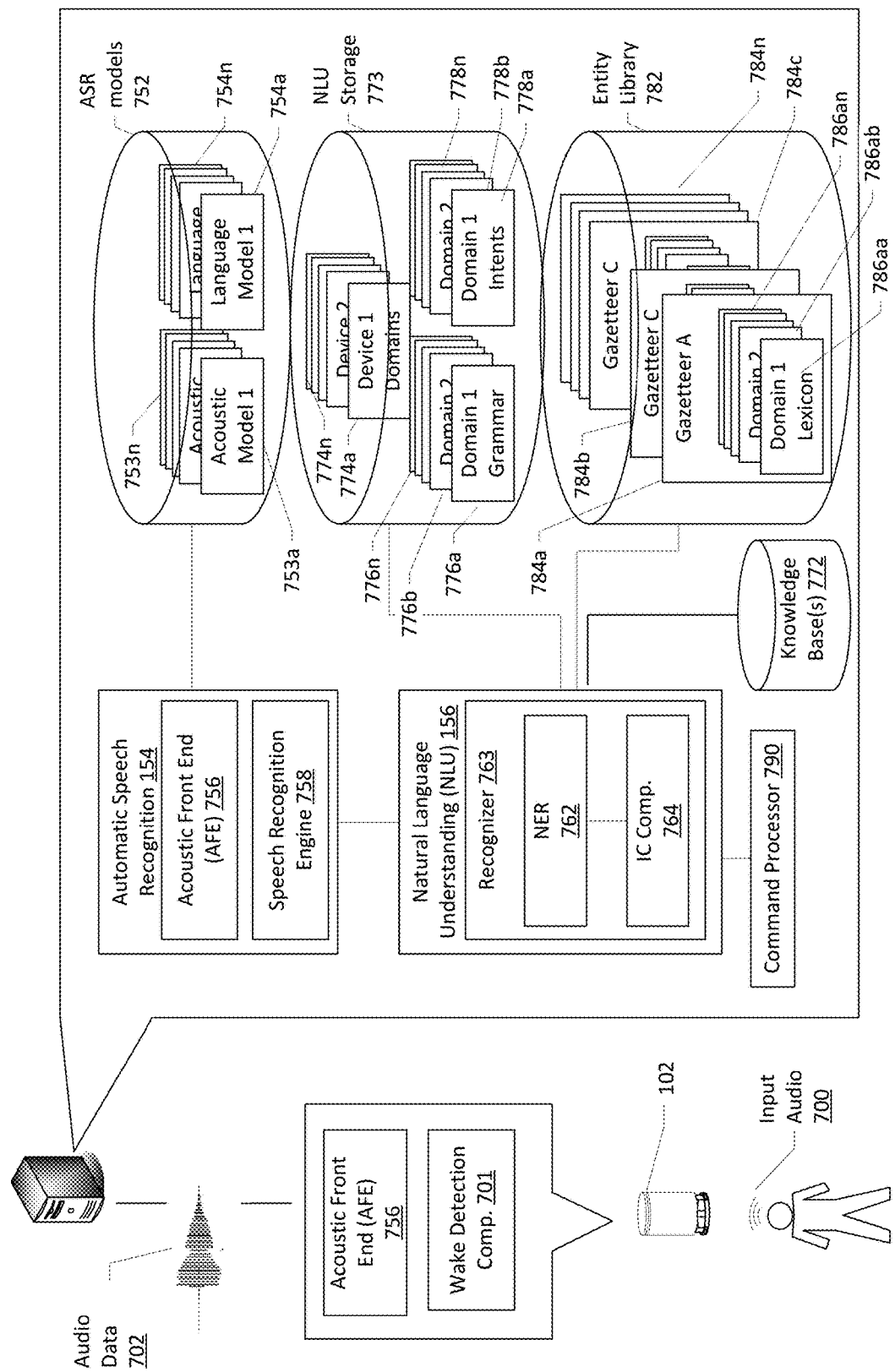
FIG. 7 illustrates a conceptual diagram of components of a speech-processing system for processing audio data provided by one or more devices.

FIG. 7 illustrates a conceptual diagram of components of a speech-processing system for processing audio data provided by one or more devices. FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 108). The various components illustrated may be located on a same device or different physical devices. Message between various components illustrated in FIG. 7 may occur directly or across a network 110. An audio capture component, such as a microphone 118 of the device 102, or another device, captures audio 700 corresponding to a spoken utterance. The device 102, using a wake-word component 701, then processes audio data corresponding to the audio 700 to determine if a keyword (such as a wakeword) is detected in the audio data. Following detection of a wakeword, the device 102 sends audio data 702 corresponding to the utterance to the remote system 108 that includes an ASR component 154. The audio data 702 may be output from an optional acoustic front end (AFE) 756 located on the device prior to transmission. In other instances, the audio data 702 may be in a different form for processing by a remote AFE 756, such as the AFE 756 located with the ASR component 154 of the remote system 108.

The wake-word component 701 works in conjunction with other components of the user device, for example a microphone to detect keywords in audio 700. For example, the device may convert audio 700 into audio data, and process the audio data with the wake-word component 701 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 701 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 702 corresponding to input audio 700 to the remote system 108 for speech processing. Audio data corresponding to that audio may be sent to remote system 108 for routing to a recipient device or may be sent to the remote system 108 for speech processing for interpretation of the included speech (either for purposes of enabling voice-messages and/or for purposes of executing a command in the speech). The audio data 702 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 108, an ASR component 154 may convert the audio data 702 into text. The ASR transcribes audio data into text data representing the words of the speech contained in the audio data 702. The text data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 154 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756) and transmit that information to a server across a network for ASR processing. Feature vectors may arrive at the remote system 108 encoded, in which case they may be decoded prior to processing by the processor executing the speech recognition engine 758.

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, start guarding my home?" The wake detection component may identify the wake word, otherwise described as a trigger expression, "Alexa," in the user utterance and may "wake" based on identifying the wake word. Audio data corresponding to the user utterance may be sent to the remote system 108, where the speech recognition engine 758 may identify, determine, and/or generate text data corresponding to the user utterance, here "start guarding my home."

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 108, for natural language understanding (NLU) processing, such as conversion of the text into commands for execution, either by the user device, by the remote system 108, or by another device (such as a server running a specific application like a search engine, etc.).

The device performing NLU processing 156 (e.g., server 108) may include various components, including potentially dedicated processor(s), memory, storage, etc. As shown in FIG. 7, an NLU component 156 may include a recognizer 763 that includes a named entity recognition (NER) component 762 which is used to identify portions of query text that correspond to a named entity that may be recognizable by the system. A downstream process called named entity resolution links a text portion to a specific entity known to the system. To perform named entity resolution, the system may utilize gazetteer information (784a-784n) stored in entity library storage 782. The gazetteer information may be used for entity resolution, for example matching ASR results with different entities (such as voice interface devices, smart devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 154 based on the utterance input audio 700) and attempts to make a semantic interpretation of the text. That is, the NLU process determines the meaning behind the text based on the individual words and then implements that meaning. NLU processing 156 interprets a text string to derive an intent or a desired action from the user as well as the pertinent pieces of information in the text that allow a device (e.g., device 102) to complete that action. For example, if a spoken utterance is processed using ASR 154 and outputs the text "start guarding my home" the NLU process may determine that the user intended to transition devices associated with "my home" to a listening state associated with guarding.

The NLU may process several textual inputs related to the same utterance. For example, if the ASR 154 outputs N text segments (as part of an N-best list), the NLU may process all N outputs to obtain NLU results.

As will be discussed further below, the NLU process may be configured to parse and tag to annotate text as part of NLU processing. For example, for the text "start guarding my home," "guarding" may be tagged as a command (to transition devices to a given state) and "my home" may be tagged as the naming identifier of the environment associated with the devices to be transitioned.

To correctly perform NLU processing of speech input, an NLU process 156 may be configured to determine a "domain" of the utterance so as to determine and narrow down which services offered by the endpoint device (e.g., remote system 108 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 762 receives a query in the form of ASR results and attempts to identify relevant grammars and lexical information that may be used to construe meaning. To do so, the NLU component 156 may begin by identifying potential domains that may relate to the received query. The NLU storage 773 includes a database of devices (774a-774n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 763, language model and/or grammar database (776a-776n), a particular set of intents/actions (778a-778n), and a particular personalized lexicon (786). Each gazetteer (784a-784n) may include domain-indexed lexical information associated with a particular user and/or device. For example, the Gazetteer A (784a) includes domain-index lexical information 786aa to 786an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 764 parses the query to determine an intent or intents for each identified domain, where the intent corresponds to the action to be performed that is responsive to the query. Each domain is associated with a database (778a-778n) of words linked to intents. For example, guard intent database may link words and phrases such as "guarding," "secure," and/or "watch," to a "guard" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 764 identifies potential intents for each identified domain by comparing words in the query to the words and phrases in the intents database 778. In some instances, the determination of an intent by the IC component 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, device name, device location, city, artist name, song name, amount of time, timer number, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC component 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (776) framework or frameworks may correspond to sentence structures such as "cause device with {Bedroom Light} identifier to turn on."

For example, the NER component 762 may parse the query to identify words as subject, object, verb, preposition, etc., based on grammar rules and/or models, prior to recognizing named entities. The identified verb may be used by the IC component 764 to identify intent, which is then used by the NER component 762 to identify frameworks. A framework for the intent of "play a song," meanwhile, may specify a list of slots/fields applicable to play the identified "song" and any object modifier (e.g., specifying a music collection from which the song should be accessed) or the like. The NER component 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 762 may search the database of generic words associated with the domain (in the knowledge base 772). So, for instance, if the query was "identify this song," after failing to determine which song is currently being output, the NER component 762 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a command processor 790. The destination command processor 790 may be determined based on the NLU output. For example, if the NLU output includes a command to send a message, the destination command processor 790 may be a message sending application, such as one located on the user device or in a message sending appliance, configured to execute a message sending command. If the NLU output includes a search request, the destination command processor 790 may include a search engine processor, such as one located on a search server, configured to execute a search command. After the appropriate command is generated based on the intent of the user, the command processor 790 may provide some or all of this information to a text-to-speech (TTS) engine. The TTS engine may then generate an actual audio file for outputting the audio data determined by the command processor 790 (e.g., "okay," or "guarding your home"). After generating the file (or "audio data"), the TTS engine may provide this data back to the remote system 108.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 156 during runtime operations where NLU operations are performed on text (such as text output from an ASR component 154). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC component 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 108 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 108, as illustrated herein are exemplary, and may be located in a stand-alone device or may be included, in whole or in part, as a component of a larger device or system, may be distributed across a network or multiple devices connected by a network, etc.

Figure 8:
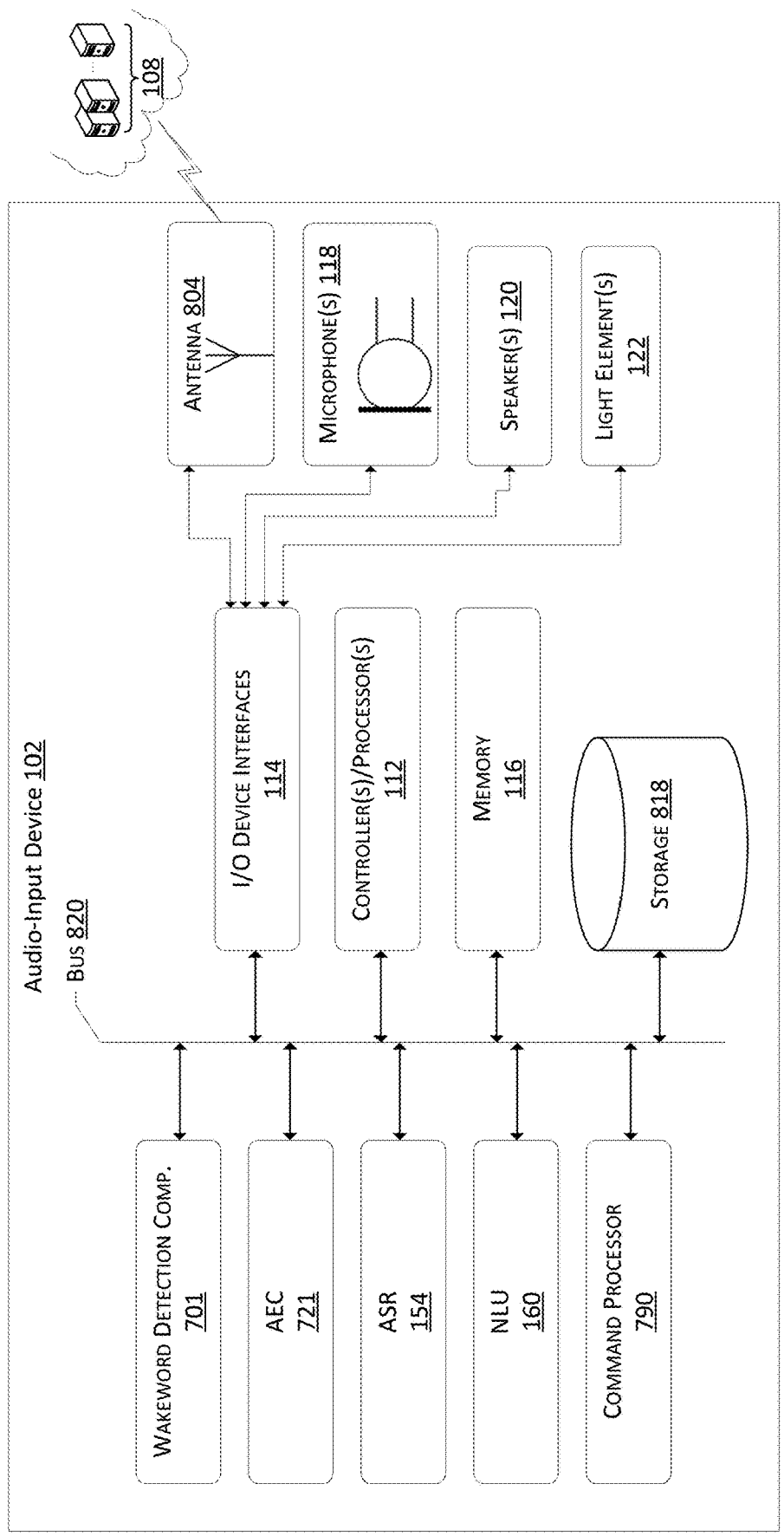
FIG. 8 illustrates a conceptual diagram of example components of an audio-input device associated with acoustic event detection model selection.

FIG. 8 illustrates a conceptual diagram of example components of an electronic device, such as an audio-input device 102, utilized during acoustic event detection model selection. For example, the device 102 may include one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 118, a power source, and functionality for sending generated audio data via one or more antennas 804 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) 120 and may utilize speaker(s) 120 of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 118, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 8 may include one or more controllers/processors 112, that may include a central processing unit (CPU) for processing data and computer-readable instructions, and memory 116 for storing data and instructions of the device 102. In examples, the skills and/or applications described herein may be stored in association with the memory 116, which may be queried for content and/or responses as described herein. The device 102 may also be connected to removable or external non-volatile memory and/or storage, such as a removable memory card, memory key drive, networked storage, etc., through input/output device interfaces 114.

Computer instructions for operating the device 102 and its various components may be executed by the device's controller(s)/processor(s) 108, using the memory 116 as "working" storage at runtime. A device's computer instructions may be stored in a non-transitory manner in non-volatile memory 116, storage 818, or an external device(s). Alternatively, some or all of the executable instructions may be embedded in hardware or firmware on the device 102 in addition to or instead of software.

The device 102 may include input/output device interfaces 114. A variety of components may be connected through the input/output device interfaces 114. Additionally, the device 102 may include an address/data bus 820 for conveying data among components of the respective device. Each component within a device 102 may also be directly connected to other components in addition to, or instead of, being connected to other components across the bus 820.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 112 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 114 that connect to a variety of components. This wired or a wireless audio and/or video port may allow for input/output of audio/video to/from the device 102. The device 102 may also include an audio capture component. The audio capture component may be, for example, a microphone 118 or array of microphones, a wired headset or a wireless headset, etc. The microphone 118 may be configured to capture audio. If an array of microphones is included, approximate distance to a sound's point of origin may be determined using acoustic localization based on time and amplitude differences between sounds captured by different microphones of the array. The device 102 (using microphone 118, wakeword detection component 701, ASR component 154, etc.) may be configured to generate audio data corresponding to captured audio. The device 102 (using input/output device interfaces 114, antenna 804, etc.) may also be configured to transmit the audio data to the remote system 108 for further processing or to process the data using internal components such as a wakeword detection component 701. It should be understood that while the wakeword detection component 701 may be configured to detect a wake word from audio data, the wakeword detection component 701 or another component configured to detect the presence of certain sound, may be utilized to detect an acoustic event such as the breaking of glass, an alarm sounding, etc.

Via the antenna(s) 804, the input/output device interface 114 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the remote system 108 may include an ASR component 154. The ASR component 154 of device 102 may be of limited or extended capabilities. The ASR component 154 may include language models stored in ASR model storage component, and an ASR component 154 that performs automatic speech recognition. If limited speech recognition is included, the ASR component 154 may be configured to identify a limited number of words, such as keywords detected by the device, whereas extended speech recognition may be configured to recognize a much larger range of words.

The device 102 and/or the remote system 108 may include a limited or extended NLU component 156. The NLU component 156 of device 102 may be of limited or extended capabilities. The NLU component 156 may comprise a name entity recognition module, an intent classification module and/or other components. The NLU component 156 may also include a stored knowledge base and/or entity library, or those storages may be separately located.

In examples, AEC may also be performed by the device 102. In these examples, the operations may include causing the AEC component 721 to be enabled or otherwise turned on, or the operations may include causing the AEC component 721 to transition from a first mode to a second mode representing a higher sensitivity to audio data generated by the microphone 118. The AEC component 721 may utilize the audio data generated by the microphone 118 to determine if an audio fingerprint of the audio data, or portion thereof, corresponds to a reference audio fingerprint associated with the predefined event.

The device 102 and/or the remote system 108 may also include a command processor 790 that is configured to execute commands/functions associated with a spoken command as described herein. The device 102 may include a wakeword detection component 701, which may be a separate component or may be included in an ASR component 154. The wakeword detection component 701 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Additionally, the device 102 may include one or more light elements 122. The light elements 122 may be utilized to provide a visual indication of a state of the device 102 and/or processes occurring with respect to the device 102. For example, the light elements 122 may be utilized to provide a visual indication of when the device 102 is in a calibration mode and/or when the device is in a "guarding" mode and/or when the microphone 118 of the device 102 has been silenced.

Figure 9:
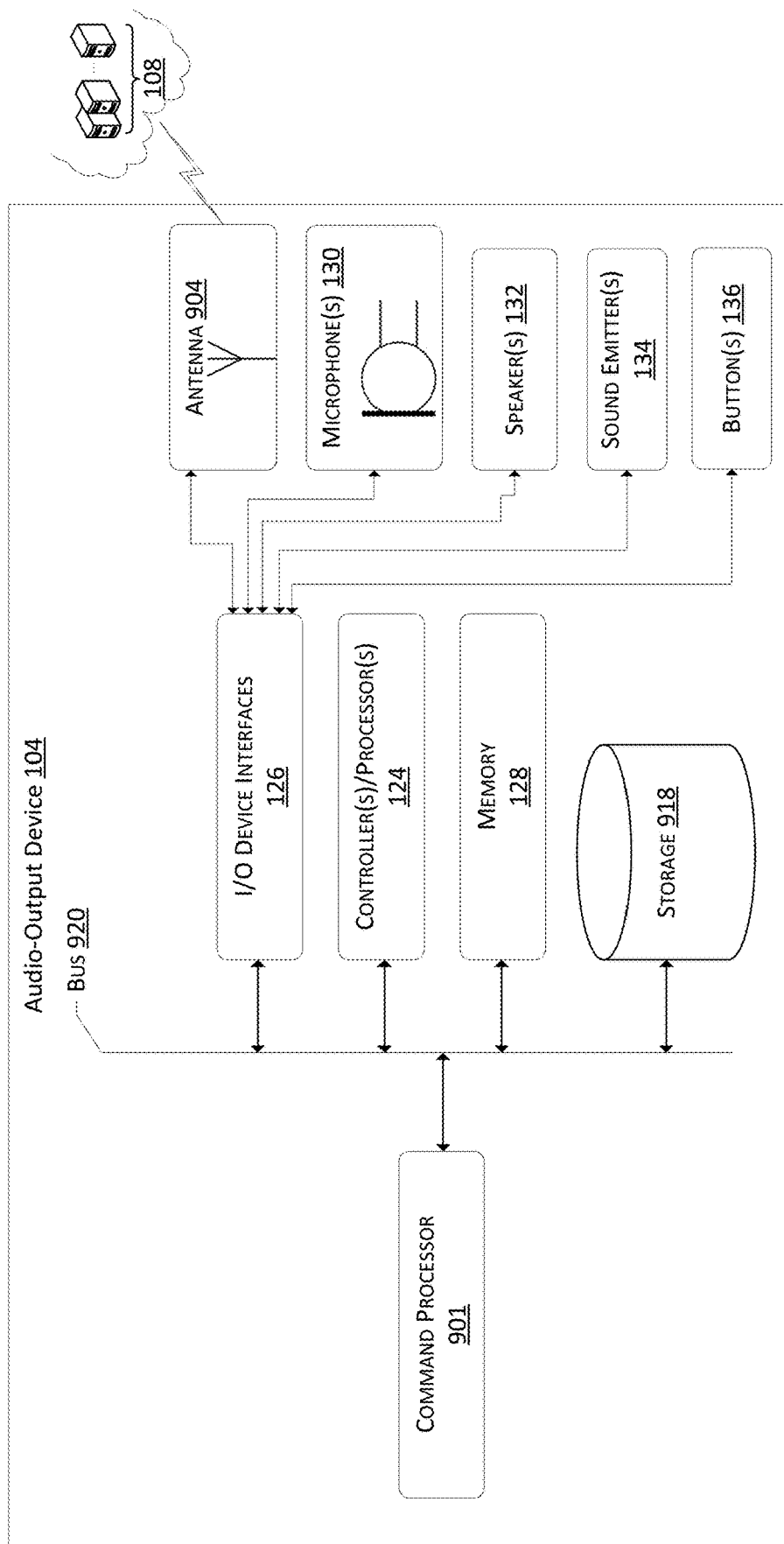
FIG. 9 illustrates a conceptual diagram of example components of an audio-output device associated with acoustic event detection model selection.

FIG. 9 illustrates a conceptual diagram of example components of an electronic device, such as an audio-output device 104, utilized during acoustic event detection model selection. For example, the device 104 may include one or more electronic devices such as a smoke alarm, a carbo dioxide alarm, a security alarm, etc. where the primary purpose of the device 104 is to output sound into an environment to indicate that an event has occurred, such as the detection of smoke or carbon dioxide. In these examples, the device 104 may not include a microphone 130 or communication means. However, in other examples, including examples where the primary purpose of the device 104 is to output sound indicating that an event has occurred, the device 104 may also include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example. The device 104 may be implemented as a standalone device that is relatively simple in terms of functional capabilities with limited input/output components, memory, and processing capabilities. For instance, the device 104 may not have a keyboard, keypad, touchscreen, or other form of mechanical input. In some instances, the device 104 may include a microphone 114, a power source, and functionality for sending generated audio data via one or more antennas 904 to another device and/or system.

The device 104 may also be implemented as a more sophisticated computing device, such as a computing device similar to, or the same as, a smart phone or personal digital assistant. The device 104 may include a display with a touch interface and various buttons for providing input as well as additional functionality such as the ability to send and receive communications. Alternative implementations of the device 104 may also include configurations as a personal computer. The personal computer may include input devices such as a keyboard, a mouse, a touchscreen, and other hardware or functionality that is found on a desktop, notebook, netbook, or other personal computing devices. In examples, the device 104 may include an automobile, such as a car. In other examples, the device 104 may include a pin on a user's clothes or a phone on a user's person. In examples, the device 104 and may not include speaker(s) 132 and may utilize speaker(s) of an external or peripheral device to output audio via the speaker(s) of the external/peripheral device. In this example, the device 104 might represent a set-top box (STB), and the device 104 may utilize speaker(s) of another device such as a television that is connected to the STB for output of audio via the external speakers. In other examples, the device 104 may not include the microphone(s) 130, and instead, the device 104 can utilize microphone(s) of an external or peripheral device to capture audio and/or generate audio data. In this example, the device 104 may utilize microphone(s) of a headset that is coupled (wired or wirelessly) to the device 104. These types of devices are provided by way of example and are not intended to be limiting, as the techniques described in this disclosure may be used in essentially any device that has an ability to recognize speech input or other types of natural language input.

The device 104 of FIG. 9 may include one or more controllers/processors 124, that may include a central processing unit (CPU) for processing data and computer-readable instructions, and memory 128 for storing data and instructions of the device 104. In examples, the skills and/or applications described herein may be stored in association with the memory 128, which may be queried for content and/or responses as described herein. The device 104 may also be connected to removable or external non-volatile memory and/or storage, such as a removable memory card, memory key drive, networked storage, etc., through input/output device interfaces 126.

Computer instructions for operating the device 104 and its various components may be executed by the device's controller(s)/processor(s) 124, using the memory 128 as "working" storage at runtime. A device's computer instructions may be stored in a non-transitory manner in non-volatile memory 128, storage 918, or an external device(s). Alternatively, some or all of the executable instructions may be embedded in hardware or firmware on the device 104 in addition to or instead of software.

The device 104 may include input/output device interfaces 126. A variety of components may be connected through the input/output device interfaces 126. Additionally, the device 104 may include an address/data bus 920 for conveying data among components of the respective device. Each component within a device 104 may also be directly connected to other components in addition to, or instead of, being connected to other components across the bus 920.

The device 104 may include a display, which may comprise a touch interface. Any suitable display technology, such as liquid crystal display (LCD), organic light emitting diode (OLED), electrophoretic, and so on, may be utilized for the displays. Furthermore, the processor(s) 124 may comprise graphics processors for driving animation and video output on the associated display. As a way of indicating to a user that a connection between another device has been opened, the device 104 may be configured with one or more visual indicators, such as the light element(s), which may be in the form of LED(s) or similar components (not illustrated), that may change color, flash, or otherwise provide visible light output, such as for a notification indicator on the device 104. The input/output device interfaces 126 that connect to a variety of components. This wired or a wireless audio and/or video port may allow for input/output of audio/video to/from the device 104. The device 104 may also include an audio capture component. The audio capture component may be, for example, a microphone 130 or array of microphones, a wired headset or a wireless headset, etc. The microphone 130 may be configured to capture audio. If an array of microphones is included, approximate distance to a sound's point of origin may be determined using acoustic localization based on time and amplitude differences between sounds captured by different microphones of the array. The device 104 (using input/output device interfaces 126, antenna 904, etc.) may also be configured to transmit audio data to the remote system 108 for processing.

Via the antenna(s) 904, the input/output device interface 126 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc.

The device 104 and/or the remote system 108 may also include a command processor 901 that is configured to execute commands/functions as described herein. For example, one or more commands may be received by the device 104 from the remote system 108 and/or from another device such as a user device and/or the audio-input device 102. The command processor 901 may receive the commands and utilize the components of the device 104 to process those commands. Such commands may cause the device 104 to output sound, such as via the speakers 132 and/or the sound emitters 134. It should be understood that in examples the speakers 132 and the sound emitters 134 may be the same component. In other examples, the speakers 132 may be separate from the sound emitters 134, such as when the sound emitters 134 include piezo-electric components.

Additionally, the device 104 may include one or more buttons 136. The buttons 136 may allow for physical input, such as by a user of the device 104. The input may cause the processors 124 to perform one or more operations, such as causing the speakers 132 and/or the sound emitters 134 to emit sound.

Figure 10:
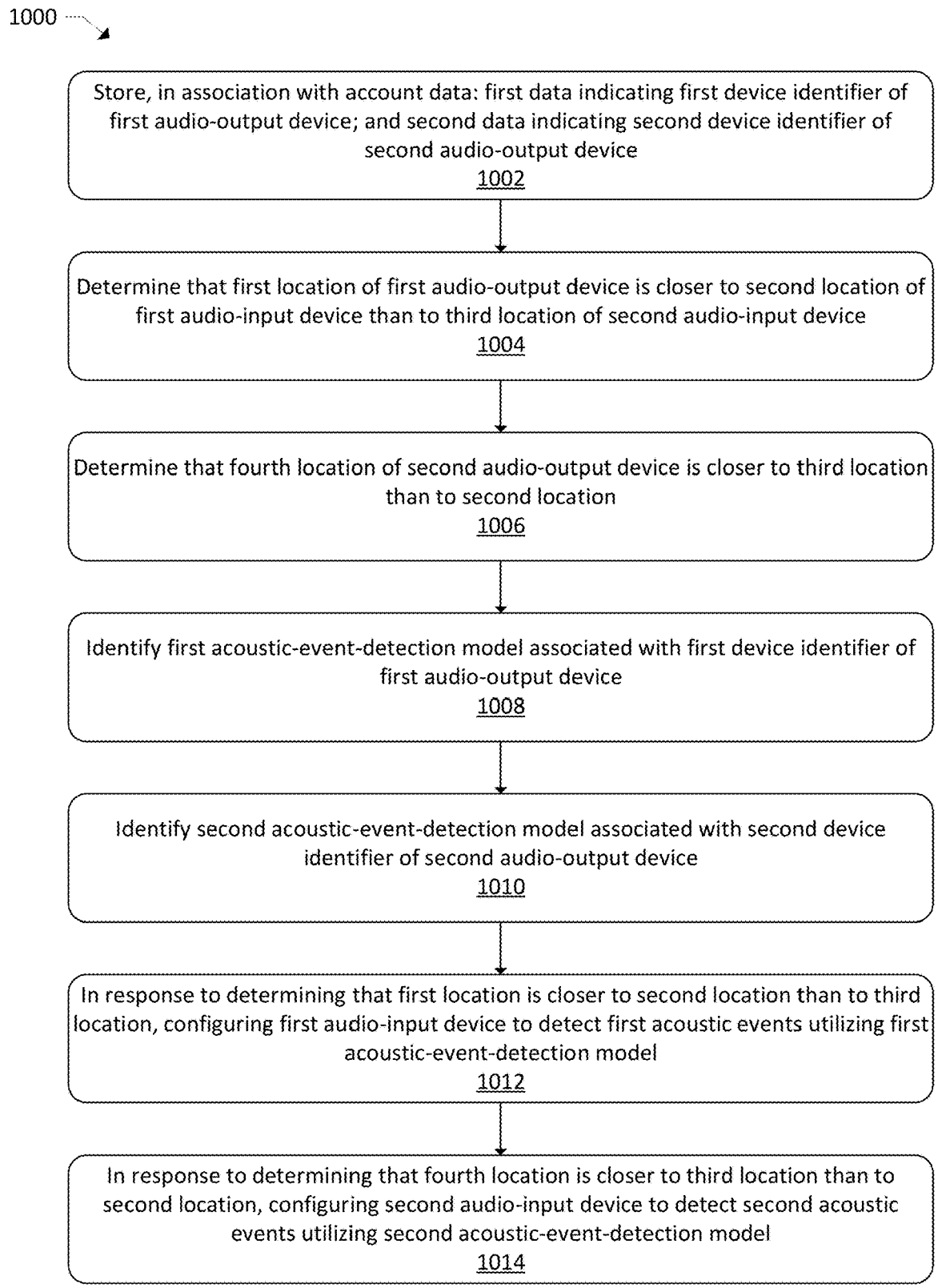
FIG. 10 illustrates a flow diagram of an example process for acoustic event detection model selection.
Figure 11:
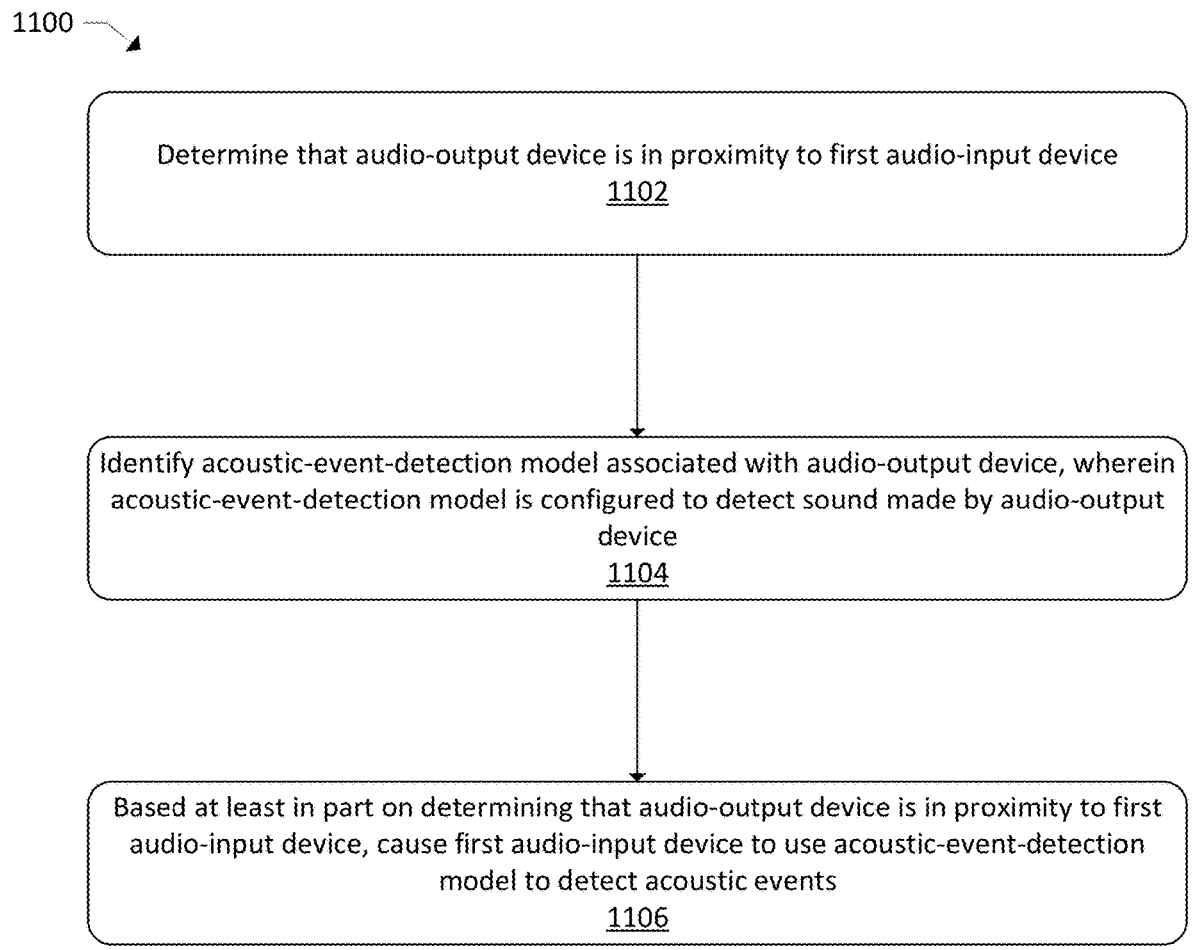
FIG. 11 illustrates a flow diagram of another example process for acoustic event detection model selection.

FIGS. 10 and 11 illustrate processes for acoustic event detection model selection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-9, although the processes may be implemented in a wide variety of other environments, architectures and systems.

FIG. 10 illustrates a flow diagram of an example process 1000 for acoustic event detection model selection. The order in which the operations or steps are described is not intended to be construed as a limitation, and any number of the described operations may be combined in any order and/or in parallel to implement process 1000.

At block 1002, the process 1000 may include storing, in association with account data: first data indicating a first device identifier of a first audio-output device; and second data indicating a second device identifier of a second audio-output device. For example, account data for a given user account may be stored in a user registry and may include data associated with devices associated with that account data. For example, the account data may indicate device identifiers of the various audio-input and audio-output devices associated with the user account. Details associated with the devices may also be stored in association with the account, such as characteristics of sounds produced by the audio-output devices and/or the acoustic-event-detection models associated with given audio-output devices.

At block 1004, the process 1000 may include determining that a first location of the first audio-output device is closer to a second location of a first audio-input device than to a third location of a second audio-input device. For example, the locations of devices may be based at least in part on whether audio is received by the audio-input devices, the signal strength and/or other audio characteristics of the audio received at the audio-input devices, contextual information such as naming indicators associated with the devices, device affinities, image data, device beaconing, etc.

At block 1006, the process 1000 may include determining that a fourth location of the second audio-output device is closer to the third location than to the second location. Determining the device locations may be performed in the same or a similar manner as described with respect to block 1004.

At block 1008, the process 1000 may include identifying a first acoustic-event-detection model associated with the first device identifier of the first audio-output device. For example, the account data may indicate one or more acoustic-event-detection models associated with the first device identifier. In other examples, a database of models may be queried utilizing the device identifier and/or other information associated with the audio-output device.

At block 1010, the process 1000 may include identifying a second acoustic-event-detection model associated with the second device identifier of the second audio-output device. Identifying the second acoustic-event-detection model may be performed in the same or a similar manner as identifying the first acoustic-event-detection model as described with respect to block 1008.

At block 1012, the process 1000 may include in response to determining that the first location is closer to the second location than to the third location, configuring the first audio-input device to detect first acoustic events utilizing the first acoustic-event-detection model. For example, the audio-input device may be configured to store one or more acoustic-event-detection models, which may be utilized by a digital signal processor of the device to detect acoustic events. The selected acoustic-event-detection model may be sent to the audio-input device for storage and use by the device.

At block 1014, the process 1000 may include in response to determining that the fourth location is closer to the third location than to the second location, configuring the second audio-input device to detect second acoustic events utilizing the second acoustic-event-detection model. Configuring the second audio-input device may be performed in the same or a similar manner as configuring the first audio-input device as described with respect to block 1012.

Additionally, or alternatively, the process 1000 may include causing the first audio-output device to produce sound. The process 1000 may also include receiving, from the first audio-input device, audio data representing the sound. The process 1000 may also include determining that the second audio-input device failed to send the audio data representing the sound. In these examples, determining that the first location is closer to the second location than to the third location may be based at least in part on receiving the audio data from the first audio-input device and determining that the second audio-input device failed to send the audio data.

Additionally, or alternatively, the process 1000 may include causing the first audio-output device to produce sound. The process 1000 may also include receiving, from the first audio-input device, first audio data representing the sound. The process 1000 may also include receiving, from the second audio-input device, second audio data representing the sound. In these examples, determining that the first location is closer to the second location than to the third location may be in response to a first signal strength of the first audio data being stronger than a second signal strength of the second audio data.

Additionally, or alternatively, the process 1000 may include determining, from the account data, a first naming indicator associated with the first audio-output device, the first naming indicator including a first location reference. The process 1000 may also include determining, from the account data, a second naming indicator associated with the first audio-input device, the second naming indicator including a second location reference. The process 1000 may also include determining that the first location reference corresponds to the second location reference. In these examples, determining that the first location is closer to the second location than to the third location may be in response to the first location reference corresponding to the second location reference.

FIG. 11 illustrates a flow diagram of an example process 1100 for acoustic event detection model selection. The order in which the operations or steps are described is not intended to be construed as a limitation, and any number of the described operations may be combined in any order and/or in parallel to implement process 1100.

At block 1102, the process 1100 may include determining that an audio-output device is in proximity to a first audio-input device. For example, the locations of devices may be based at least in part on whether audio is received by the audio-input devices, the signal strength and/or other audio characteristics of the audio received at the audio-input devices, contextual information such as naming indicators associated with the devices, device affinities, image data, device beaconing, etc. In examples, determining that one device is in proximity of another device may be based at least in part on signal strength data indicating that a signal strength between devices is greater than between other devices and/or that the signal strength satisfies a threshold signal strength, the capturing of audio during a test operation, user indication of associations between devices (such as via user input to a device running an instance of an application associated with the devices), naming indicators of devices, another device detecting both the input device and the output device at the same time, any other proximity-related information and/or data, and/or any combination thereof.

At block 1104, the process 1100 may include identifying an acoustic-event-detection model associated with the audio-output device, wherein the acoustic-event-detection model is configured to detect a sound made by the audio-output device. For example, the account data may indicate one or more acoustic-event-detection models associated with the device. In other examples, a database of models may be queried utilizing the device identifier and/or other information associated with the audio-output device.

At block 1106, the process 1100 may include based at least in part on determining that the audio-output device is in proximity to the first audio-input device, causing the first audio-input device to use the acoustic-event-detection model to detect acoustic events. For example, the audio-input device may be configured to store one or more acoustic-event-detection models, which may be utilized by a digital signal processor of the device to detect acoustic events. The selected acoustic-event-detection model may be sent to the audio-input device for storage and use by the device.

Additionally, or alternatively, the process 1100 may include causing the first audio-output device to produce sound. The process 1100 may also include receiving, from the first audio-input device, audio data representing the sound. The process 1100 may also include determining that the second audio-input device failed to send the audio data representing the sound. In these examples, determining that the first location is closer to the second location than to the third location may be based at least in part on receiving the audio data from the first audio-input device and determining that the second audio-input device failed to send the audio data.

Additionally, or alternatively, the process 1100 may include causing the first audio-output device to produce sound. The process 1100 may also include receiving, from the first audio-input device, first audio data representing the sound. The process 1100 may also include receiving, from the second audio-input device, second audio data representing the sound. In these examples, determining that the first location is closer to the second location than to the third location may be in response to a first signal strength of the first audio data being stronger than a second signal strength of the second audio data.

Additionally, or alternatively, the process 1100 may include determining, from the account data, a first naming indicator associated with the first audio-output device, the first naming indicator including a first location reference. The process 1100 may also include determining, from the account data, a second naming indicator associated with the first audio-input device, the second naming indicator including a second location reference. The process 1100 may also include determining that the first location reference corresponds to the second location reference. In these examples, determining that the first location is closer to the second location than to the third location may be in response to the first location reference corresponding to the second location reference.

Additionally, or alternatively, the process 1100 may include receiving first data indicating that the audio-output device was acquired in association with account data, the account data associated with the first audio-input device and the second audio-input device. The process 1100 may also include identifying the device identifier of the audio-output device based at least in part on the first data. The process 1100 may also include querying a model database for the acoustic-event-detection model utilizing the device identifier. In these examples, configuring the first audio-input device may include sending an instance of the acoustic-event-detection model to the first audio-input device.

Additionally, or alternatively, the process 1100 may include receiving audio data from the first audio-input device representing sound produced by the audio-output device. The process 1100 may also include storing first data indicating a device type associated with the first audio-output device. The process 1100 may also include training one or more acoustic-event-detection models associated with the device type based at least in part on the audio data.

Additionally, or alternatively, the process 1100 may include causing the audio-output device to produce sound and determining that the first audio-input device failed to send audio data representing the sound. The process 1100 may also include determining, based at least in part on determining that the first audio-input device failed to send the audio data, that the first audio-input device is in a first microphone state. The process 1100 may also include generating notification data indicating that the first audio-input device is in the first microphone state and sending the notification data to a user device associated with the account data.

Additionally, or alternatively, the process 1100 may include determining, based at least in part on account data, a first naming indicator associated with the audio-output device, the first naming indicator including a first location reference. The process 1100 may also include determining, based at least in part on the account data, a second naming indicator associated with the first audio-input device, the second naming indicator including a second location reference. The process 1100 may also include determining that the first location reference corresponds to the second location reference. In these examples, determining that the first location is closer to the second location than to the third location may be based at least in part on the first location reference corresponding to the second location reference.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
storing, in association with account data:
first data indicating a first device identifier of a first audio-output device; and
second data indicating a second device identifier of a second audio-output device;
determining that a first location of the first audio-output device is closer to a second location of a first audio-input device than to a third location of a second audio-input device;
determining that a fourth location of the second audio-output device is closer to the third location than to the second location;
identifying a first acoustic-event-detection model associated with the first device identifier of the first audio-output device;
identifying a second acoustic-event-detection model associated with the second device identifier of the second audio-output device;
in response to determining that the first location is closer to the second location than to the third location, configuring the first audio-input device to detect first acoustic events utilizing the first acoustic-event-detection model; and
in response to determining that the fourth location is closer to the third location than to the second location, configuring the second audio-input device to detect second acoustic events utilizing the second acoustic-event-detection model.

2. The system of claim 1, the operations further comprising:
causing the first audio-output device to produce sound;
receiving, from the first audio-input device, audio data representing the sound;
determining that the second audio-input device failed to send the audio data representing the sound; and
wherein determining that the first location is closer to the second location than to the third location is based at least in part on receiving the audio data from the first audio-input device and determining that the second audio-input device failed to send the audio data.

3. The system of claim 1, the operations further comprising:
causing the first audio-output device to produce sound;
receiving, from the first audio-input device, first audio data representing the sound;
receiving, from the second audio-input device, second audio data representing the sound; and
wherein determining that the first location is closer to the second location than to the third location is in response to a first signal strength of the first audio data being stronger than a second signal strength of the second audio data.

4. The system of claim 1, the operations further comprising:
determining, from the account data, a first naming indicator associated with the first audio-output device, the first naming indicator including a first location reference;
determining, from the account data, a second naming indicator associated with the first audio-input device, the second naming indicator including a second location reference;
determining that the first location reference corresponds to the second location reference; and
wherein determining that the first location is closer to the second location than to the third location is in response to the first location reference corresponding to the second location reference.

5. A method, comprising:
determining that an audio-output device is in proximity to a first audio-input device;
identifying, from multiple acoustic-event-detection models associated with a speech processing system, an acoustic-event-detection model associated with the audio-output device, wherein the acoustic-event-detection model is configured to detect a sound made by the audio-output device, wherein the acoustic-event-detection model is selected from the multiple acoustic-event-detection models; and
based at least in part on determining that the audio-output device is in proximity to the first audio-input device, selecting the first audio-input device to use the acoustic-event-detection model to detect acoustic events.

6. The method of claim 5, further comprising:
receiving first data indicating that the audio-output device was acquired in association with account data, the account data associated with the first audio-input device and a second audio-input device;
identifying the audio-output device based at least in part on the first data;
querying a model database for the acoustic-event-detection model utilizing an identifier of the audio-output device; and
wherein selecting the first audio-input device to use the acoustic-event-detection model comprises sending an instance of the acoustic-event-detection model to the first audio-input device.

7. The method of claim 5, further comprising:
receiving audio data from the first audio-input device representing the sound produced by the audio-output device;
storing first data indicating a device type associated with the first audio-output device; and
training one or more acoustic-event-detection models associated with the device type based at least in part on the audio data.

8. The method of claim 5, further comprising:
causing the audio-output device to produce the sound;
determining that the first audio-input device failed to send audio data representing the sound;
determining, based at least in part on determining that the first audio-input device failed to send the audio data, that the first audio-input device is in a first microphone state;
generating notification data indicating that the first audio-input device is in the first microphone state; and
sending the notification data to a user device associated with the account data.

9. The method of claim 5, further comprising:
causing the audio-output device to produce the sound;
receiving, from the first audio-input device, audio data representing the sound;
determining that a second audio-input device failed to send the audio data representing the sound; and
determining that the first audio-input device is closer to the audio-output device than to the second audio-input device based at least in part on receiving the audio data from the first audio-input device and determining that the second audio-input device failed to send the audio data.

10. The method of claim 5, further comprising:
causing the audio-output device to produce sound;
receiving, from the first audio-input device, first audio data representing the sound;
receiving, from a second audio-input device, second audio data representing the sound; and
determining that the audio-output device is in proximity to the first audio-input device based at least in part on a first signal strength of the first audio data and a second signal strength of the second audio data.

11. The method of claim 5, further comprising:
determining, based at least in part on account data, a first naming indicator associated with the audio-output device, the first naming indicator including a first location reference;
determining, based at least in part on the account data, a second naming indicator associated with the first audio-input device, the second naming indicator including a second location reference;
determining that the first location reference corresponds to the second location reference; and
determining that the audio-output device is in proximity to the first audio-input device based at least in part on the first location reference corresponding to the second location reference.

12. The method of claim 5, further comprising:
determining a first number of communications between the audio-output device and the first audio-input device over a period of time;
determining a second number of communications between the audio-output device and a second audio-input device over the period of time;
determining that the first number of communications is more than the second number of communications; and
determining that the audio-output device is in proximity to the first audio-input device based at least in part on the first number of communications being more than the second number of communications.

13. A system, comprising:
one or more processors; and
non-transitory computer-readable media storing computer-executable instructions that, when executed by the one or more processors, cause the one or more processors to perform operations comprising:
determining that an audio-output device is in proximity to a first audio-input device;
identifying, from multiple acoustic-event-detection models associated with a speech processing system, an acoustic-event-detection model associated with the audio-output device, wherein the acoustic-event-detection model is configured to detect a sound made by the audio-output device, wherein the acoustic-event-detection model is selected from the multiple acoustic-event-detection models; and
based at least in part on determining that the audio-output device is in proximity to the first audio-input device, selecting the first audio-input device to use the acoustic-event-detection model to detect acoustic events.

14. The system of claim 13, the operations further comprising:
receiving first data indicating that the audio-output device was acquired in association with account data, the account data associated with the first audio-input device and a second audio-input device;
identifying the audio-output device based at least in part on the first data;
querying a model database for the acoustic-event-detection model utilizing an identifier of the audio-output device; and
wherein selecting the first audio-input device to use the acoustic-event-detection model comprises sending an instance of the acoustic-event-detection model to the first audio-input device.

15. The system of claim 13, the operations further comprising:

receiving audio data from the first audio-input device representing the sound produced by the audio-output device;

storing first data indicating a device type associated with the first audio-output device; and training one or more acoustic-event-detection models associated with the device type based at least in part on the audio data.

16. The system of claim 13, the operations further comprising:

causing the audio-output device to produce the sound;

determining that the first audio-input device failed to send audio data representing the sound;

determining, based at least in part on determining that the first audio-input device failed to send the audio data, that the first audio-input device is in a first microphone state;

generating notification data indicating that the first audio-input device is in the first microphone state; and sending the notification data to a user device associated with the account data.

17. The system of claim 13, the operations further comprising:

causing the audio-output device to produce the sound;

receiving, from the first audio-input device, audio data representing the sound;

determining that a second audio-input device failed to send the audio data representing the sound; and determining that the first audio-input device is closer to the audio-output device than to the second audio-input device is based at least in part on receiving the audio data from the first audio-input device and determining that the second audio-input device failed to send the audio data.

18. The system of claim 13, the operations further comprising:

causing the audio-output device to produce sound;

receiving, from the first audio-input device, first audio data representing the sound;

receiving, from a second audio-input device, second audio data representing the sound; and determining that the audio-output device is in proximity to the first audio-input device based at least in part on a first signal strength of the first audio data and a second signal strength of the second audio data.

19. The system of claim 13, the operations further comprising:

determining, based at least in part on account data, a first naming indicator associated with the audio-output device, the first naming indicator including a first location reference;

determining, based at least in part on the account data, a second naming indicator associated with the first audio-input device, the second naming indicator including a second location reference;

determining that the first location reference corresponds to the second location reference; and determining that the audio-output device is in proximity to the first audio-input device based at least in part on the first location reference corresponding to the second location reference.

20. The system of claim 13, the operations further comprising:

determining a first number of communications between the audio-output device and the first audio-input device over a period of time;

determining a second number of communications between the audio-output device and a second audio-input device over the period of time;

determining that the first number of communications is more than the second number of communications; and determining that the audio-output device is in proximity to the first audio-input device based at least in part on the first number of communications being more than the second number of communications.

\* \* \* \* \*